(12) United States Patent
Grip et al.

(10) Patent No.: US 12,122,509 B2
(45) Date of Patent: Oct. 22, 2024

(54) VARIABLE RADIUS ASSEMBLY AND METHOD OF USING THE SAME

(71) Applicant: The Boeing Company, Arlington, VA (US)

(72) Inventors: Robert E. Grip, Rancho Palos Verdes, CA (US); John J. Brown, Costa Mesa, CA (US); Nathaniel J. Noel, North Charleston, SC (US)

(73) Assignee: The Boeing Company, Arlington, VA (US)

( * ) Notice: Subject to any disclaimer, the term of this patent is extended or adjusted under 35 U.S.C. 154(b) by 24 days.

(21) Appl. No.: 18/171,346

(22) Filed: Feb. 18, 2023

(65) Prior Publication Data

US 2024/0278901 A1 Aug. 22, 2024

(51) Int. Cl.
*B64C 3/18* (2006.01)
*B64C 3/48* (2006.01)

(52) U.S. Cl.
CPC . *B64C 3/18* (2013.01); *B64C 3/48* (2013.01)

(58) Field of Classification Search
CPC ....... B64C 3/00; B64C 2003/445; B64C 3/48; B64C 3/18
See application file for complete search history.

(56) References Cited

U.S. PATENT DOCUMENTS

| | | |
|---|---|---|
| 9,598,167 B2 | 3/2017 | Grip et al. |
| 10,773,786 B2 | 9/2020 | Sclafani et al. |
| 2012/0292945 A1* | 11/2012 | Nusbaum ............. B62D 35/001 296/180.5 |
| 2022/0297825 A1* | 9/2022 | Simonneaux ............. B64C 1/26 |

* cited by examiner

*Primary Examiner* — Brady W Frazier
*Assistant Examiner* — Shanna Danielle Glover

(57) ABSTRACT

There is provided a variable radius assembly having a spindle, at least one variable radius guide member coupled to, and driven by, the spindle, and a tension member attached to the variable radius guide member. The tension member is configured to attach to at least one variable length structural member. The variable radius assembly further has at least one gear coupled to, and driven by, the spindle, and has at least one rotational power source coupled to the spindle, and configured to rotate the spindle. The variable radius guide member enables a tension member length change at a non-linear rate for a constant rate of rotation of the spindle, allowing the at least one variable length structural member to be braced by the tension member at an inclination angle to the at least one variable length structural member throughout a range of motion.

20 Claims, 25 Drawing Sheets

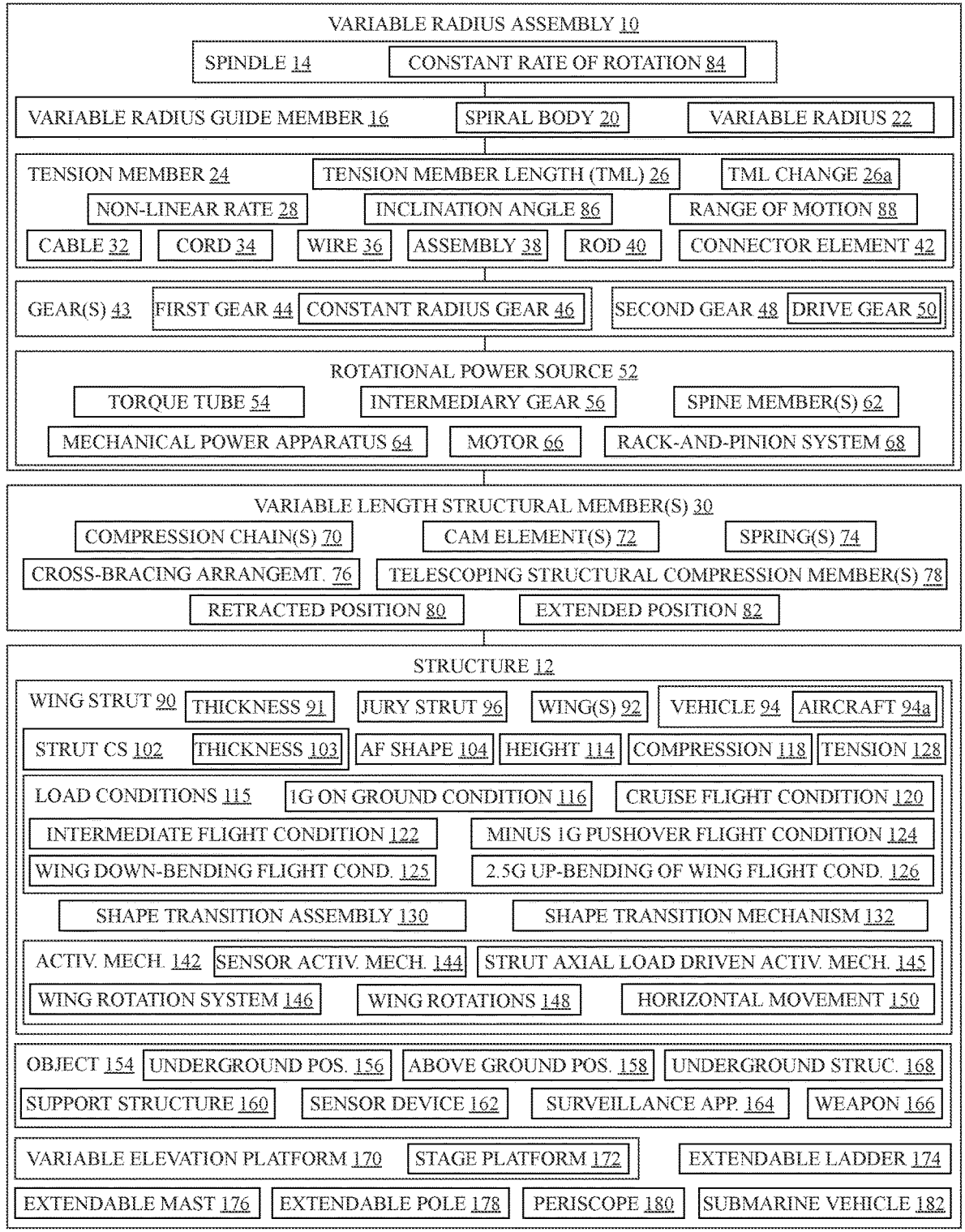

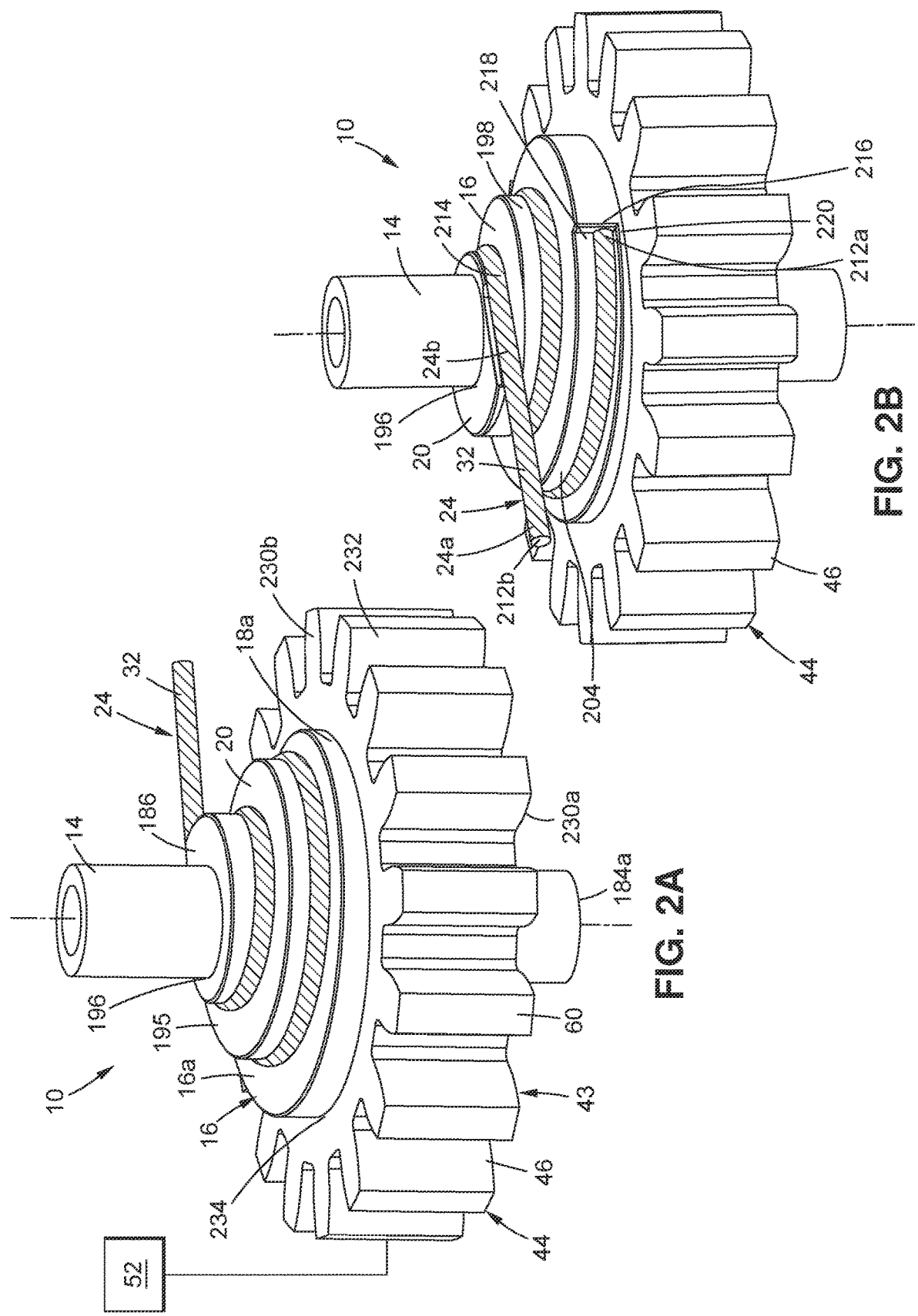

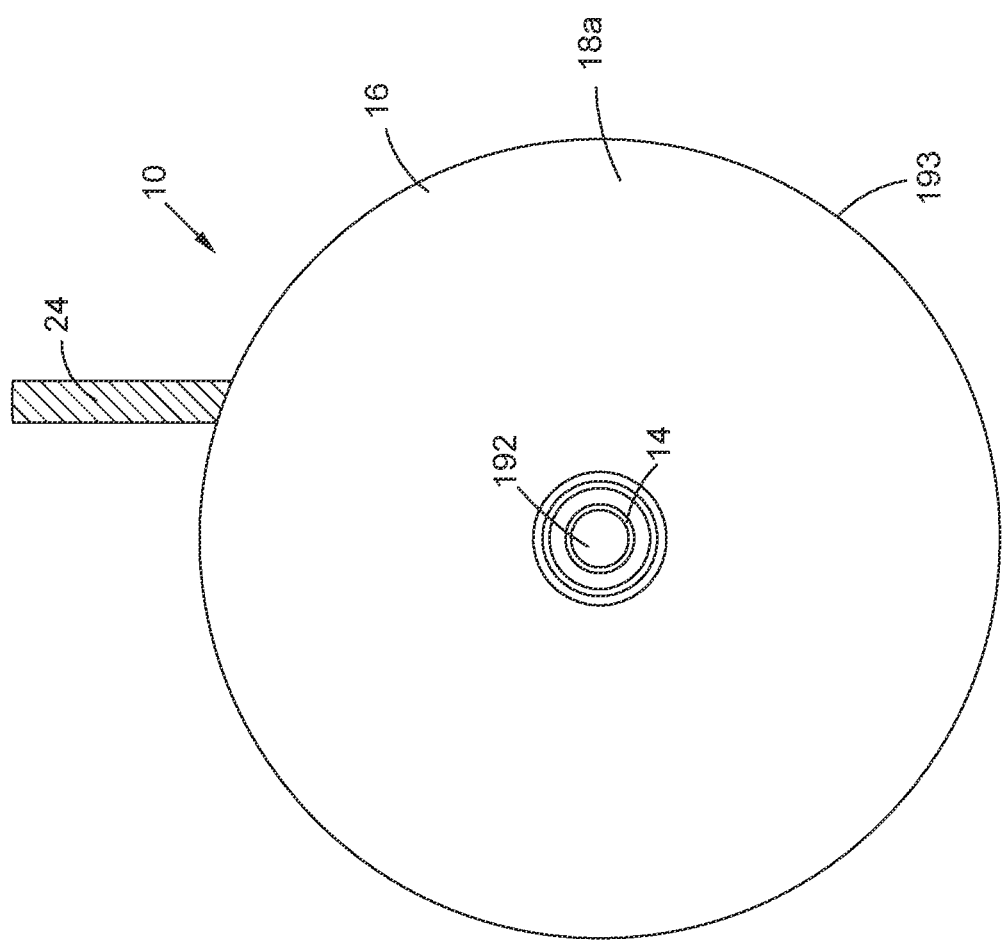

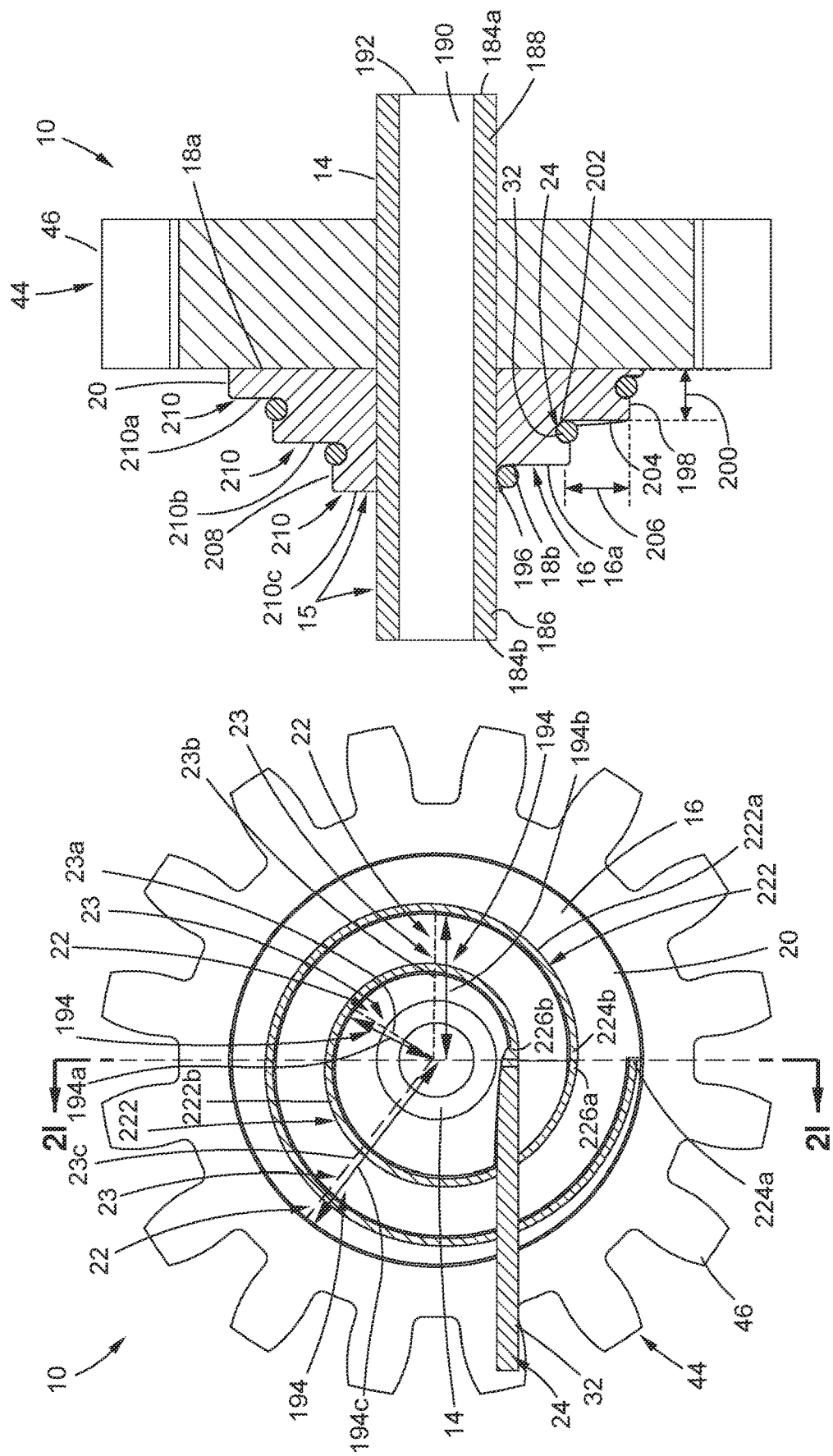

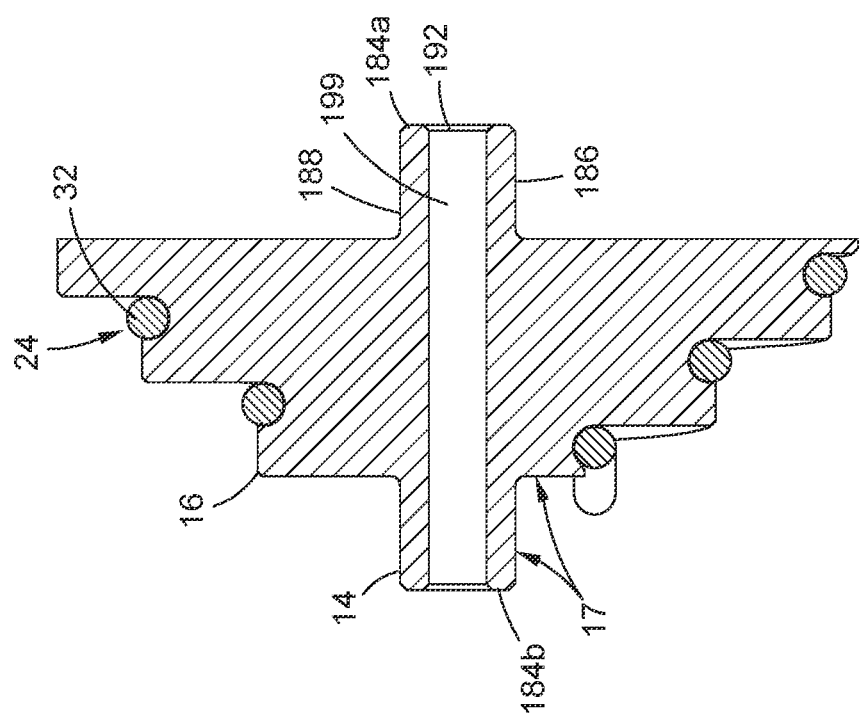

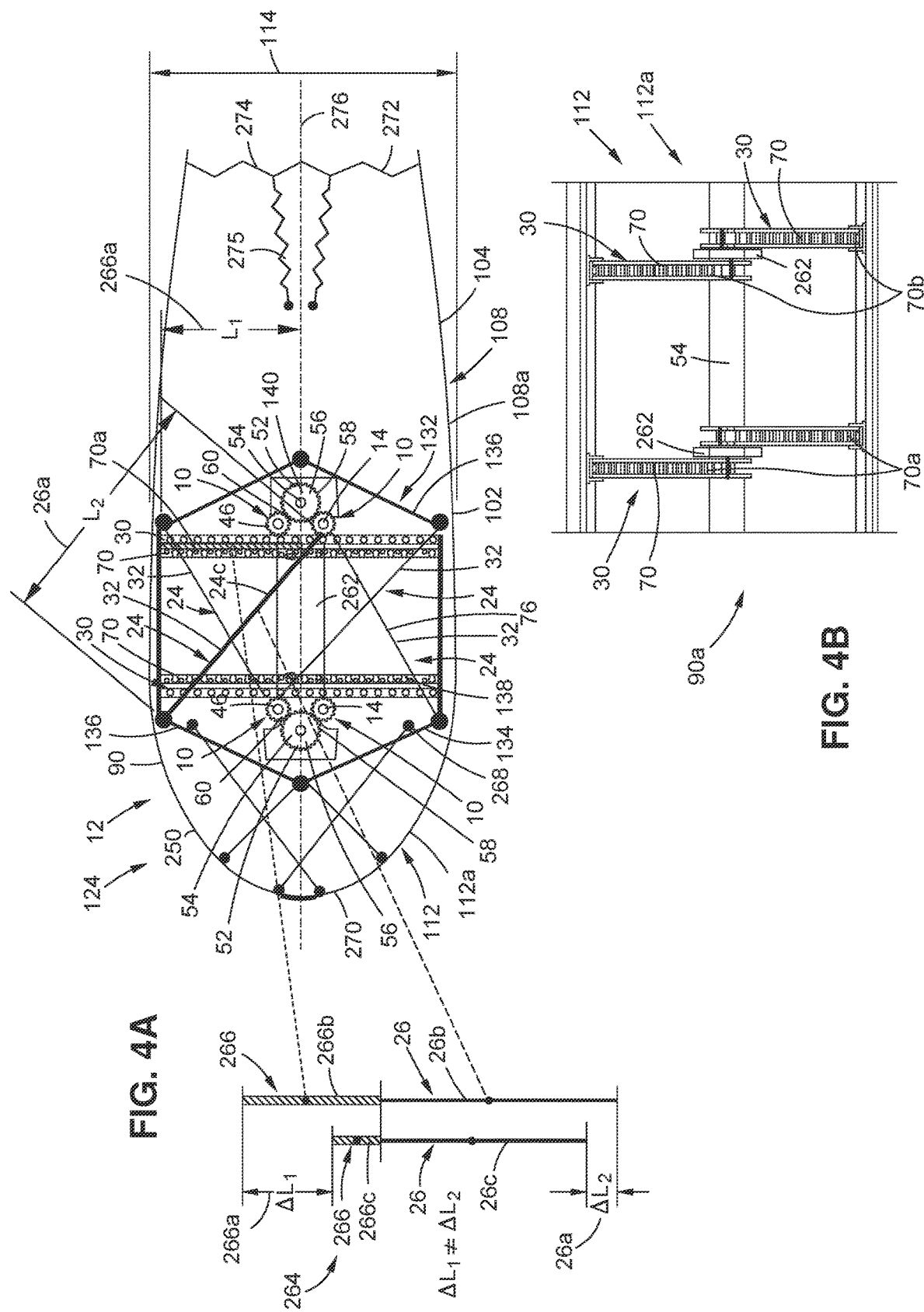

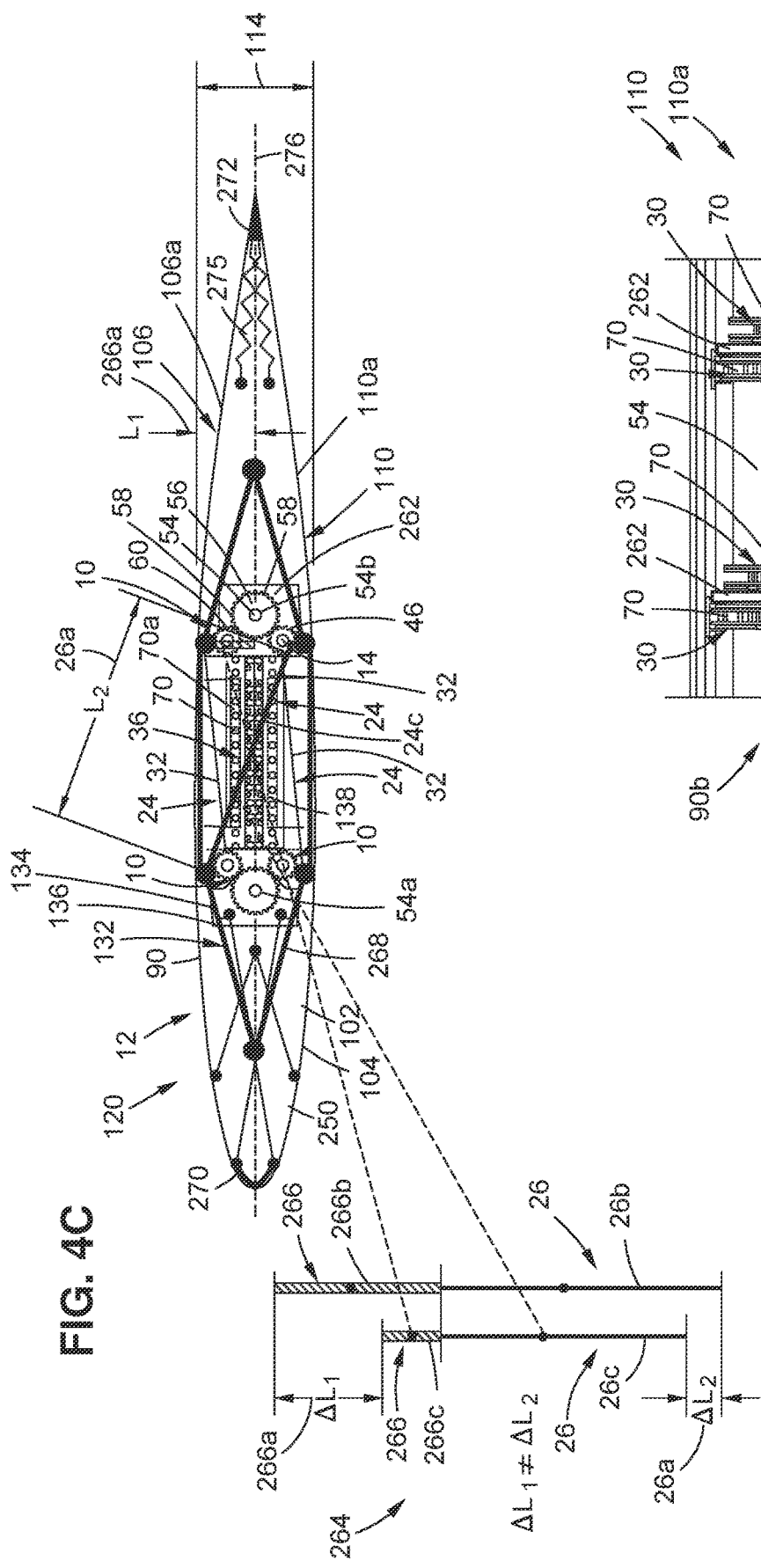

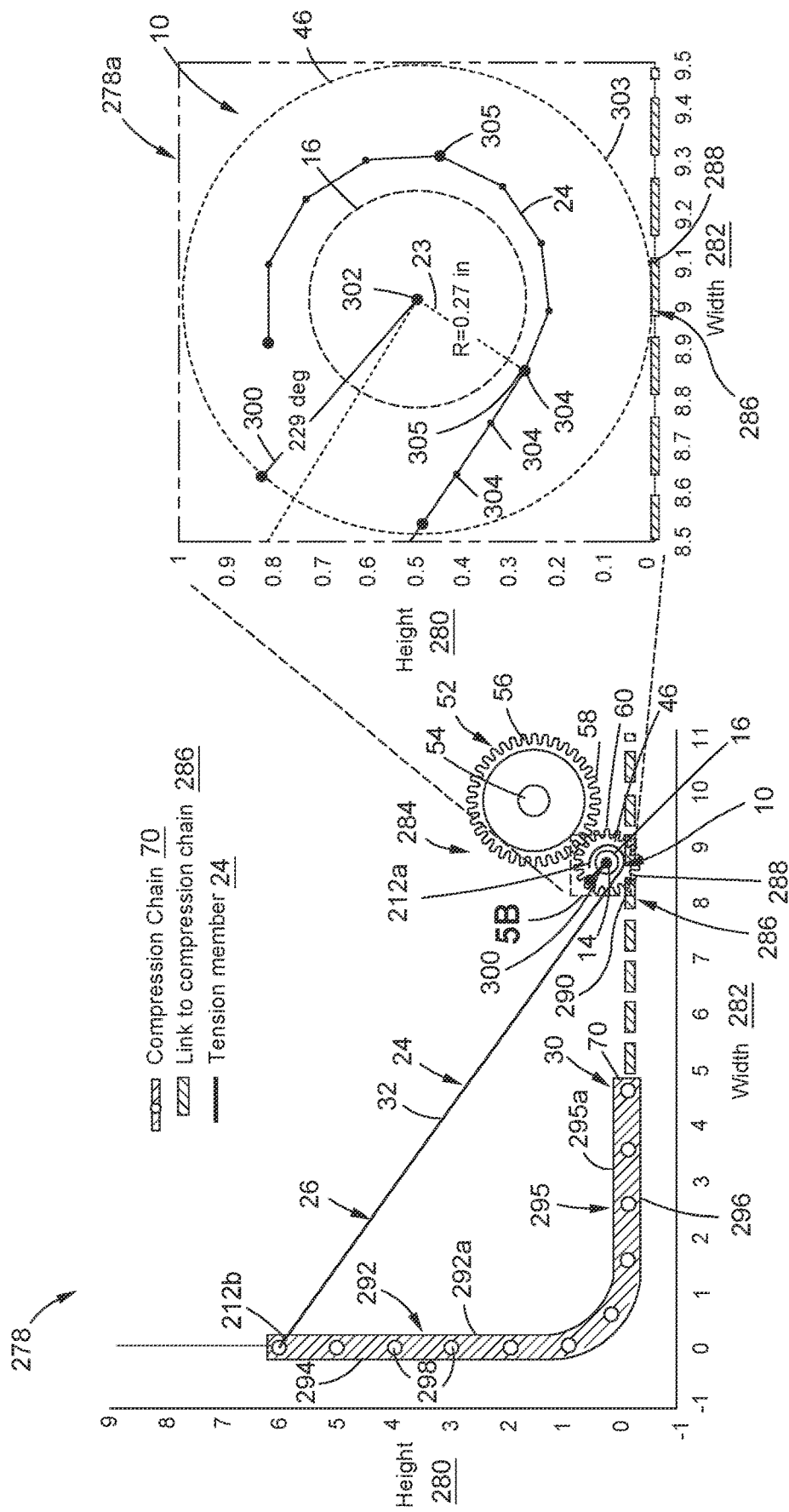

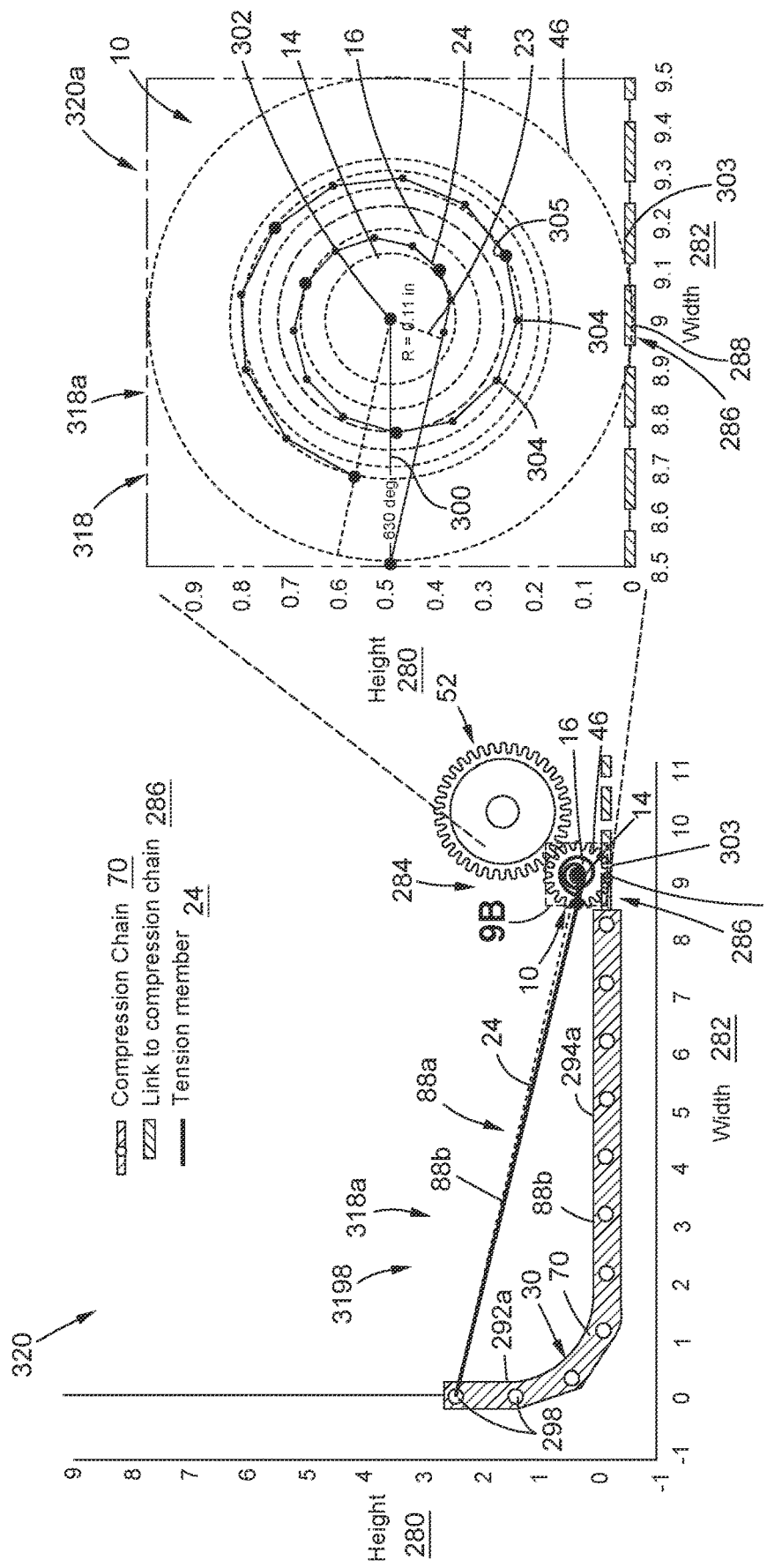

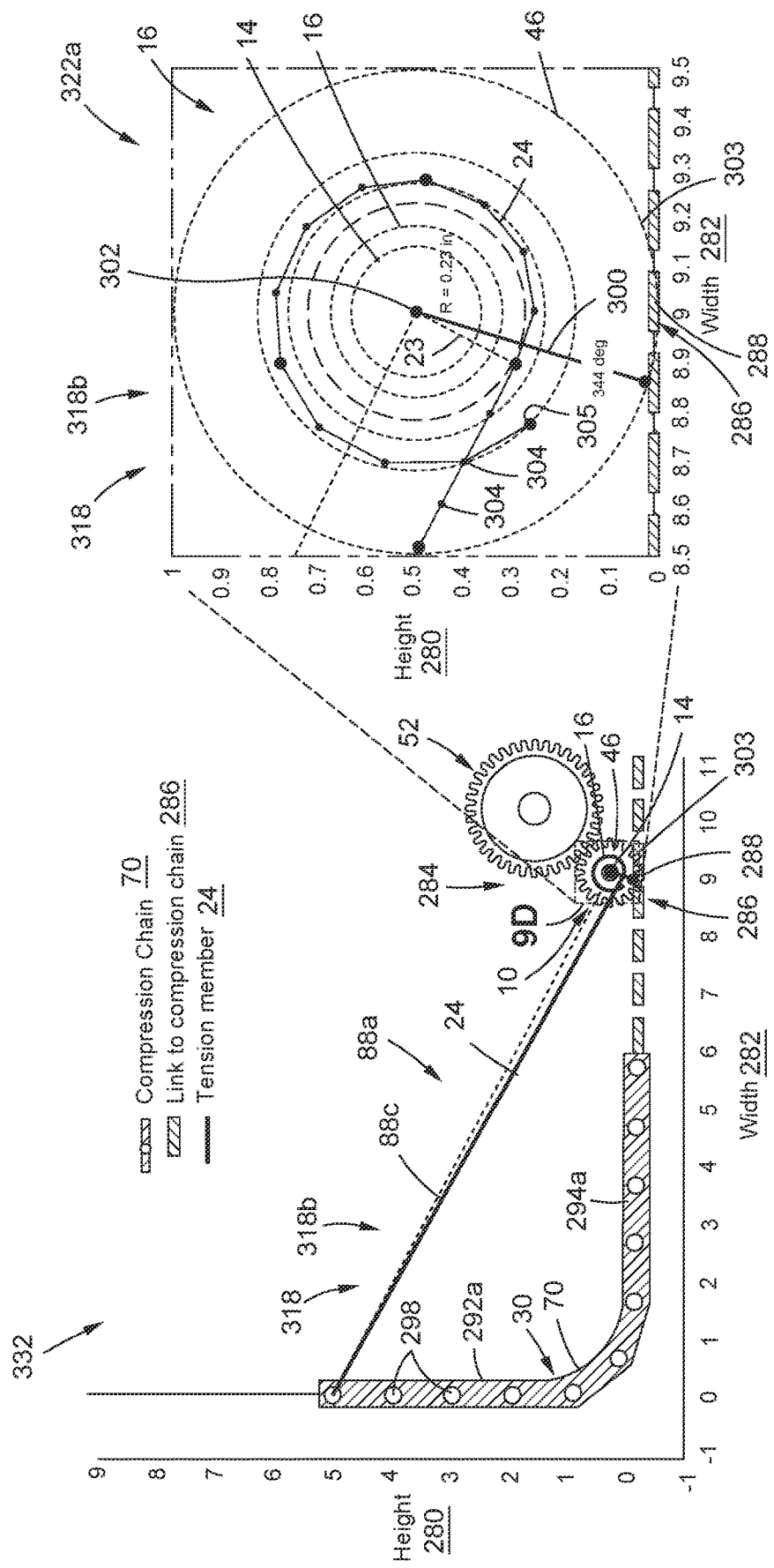

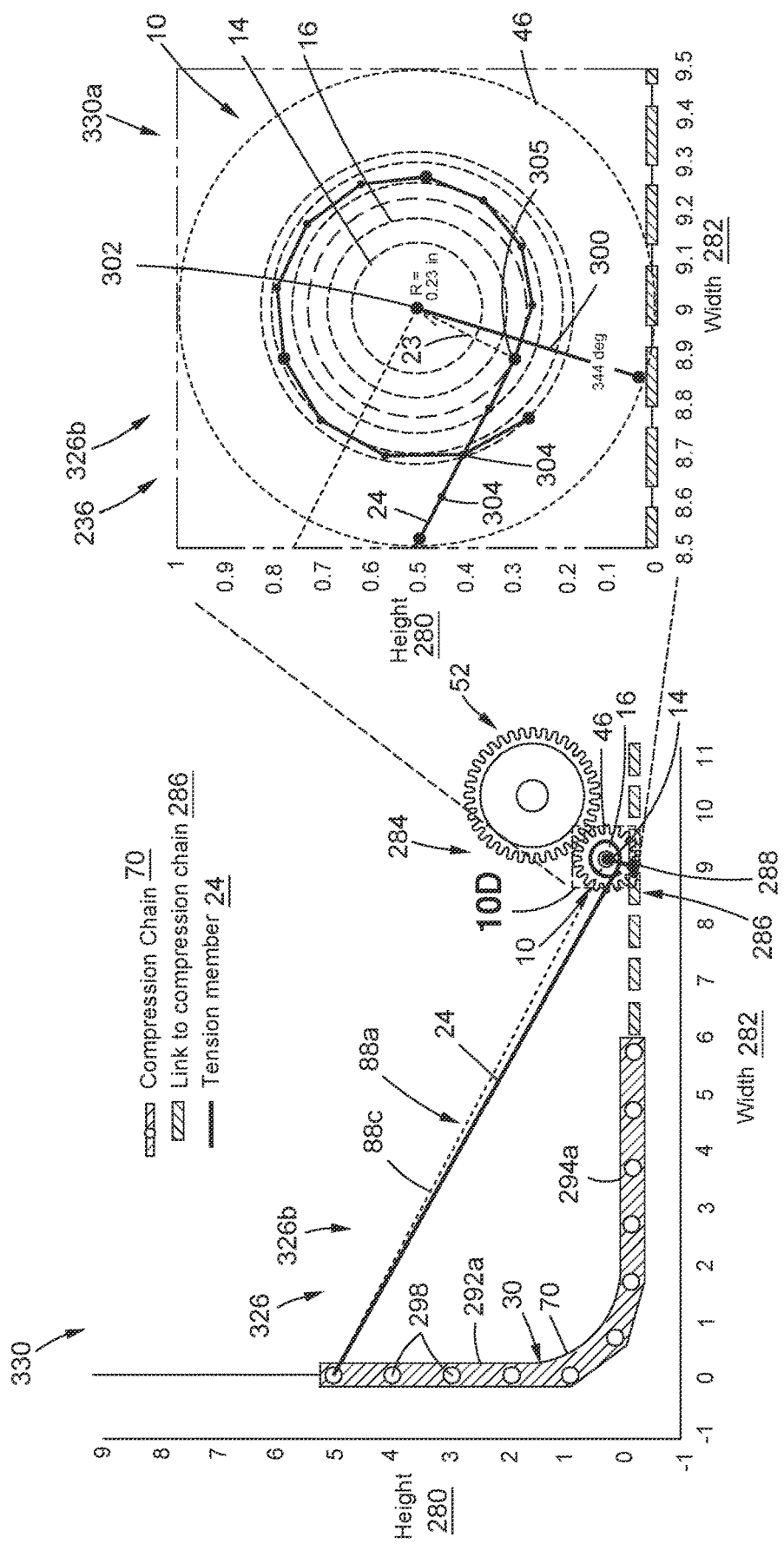

VARIABLE RADIUS ASSEMBLY AND METHOD OF USING THE SAME

CROSS-REFERENCE TO RELATED APPLICATIONS

This nonprovisional patent application is related to contemporaneously filed U.S. nonprovisional patent application Ser. No. 18/171,345, titled EXPANDABLE STRUT ASSEMBLY FOR A WING OF AN AIRCRAFT AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,345 is not admitted to be prior art with respect to this application having Ser. No. 18/171,346.

This nonprovisional patent application is also related to contemporaneously filed U.S. nonprovisional patent application Ser. No. 18/171,347, titled EXTENDABLE COMPRESSION CHAIN SYSTEM AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,347 is not admitted to be prior art with respect to this application having Ser. No. 18/171,346.

FIELD

The disclosure relates generally to a variable radius assembly, and more particularly, to a variable radius assembly coupled to a variable length structural member for use in a structure, for example, a wing strut of an aircraft, to enable a non-linear rate of a tension member length change for a constant rotation of a spindle.

BACKGROUND

Wings of an aircraft having strut support, i.e., strut-braced wings, reduce the overall weight of the wing and reduce the bending moment in the inboard wing, where the wing attaches to the fuselage, as compared to wings that do not have strut support, i.e., cantilever wings. With the aircraft in flight, a wing strut connected to the fuselage of the aircraft and connected to the underside of the wing generally experiences a load condition, such as a tension load, and with the aircraft on the ground the strut experiences a load condition, such as compression load under 1 g (gravitational force) conditions. A wing strut must also be designed for a −1 g (minus one g) pushover flight condition for the aircraft, which places the strut in axial compression. The amount of axial material in the strut is sized by the tension condition, while the thickness the strut is sized is typically by Euler buckling under the −1 g pushover flight condition.

Known designs of wing struts exist to address the −1 g pushover flight condition. One known wing strut design includes a full-span wing strut that spans and connects between the fuselage of the aircraft and the underside of the wing and that generally has a low aerodynamic drag. However, such full-span wing struts may be thick and heavy because the buckling length is longer.

Another known wing strut design includes the addition of one or more jury struts, or auxiliary struts, fastened along a length of a primary strut and substantially normal to an axis of the primary strut, where the primary strut is typically thinner than a full-span strut. Jury struts, or auxiliary struts, break up the buckling length of the primary strut into smaller segments along the length of the primary strut, and save weight because the buckling length is shorter. However, the addition of one or more jury struts, or auxiliary struts, may increase aerodynamic drag of the aircraft.

Yet another known wing strut member design includes a cable strut that is very thin and light and is connected between the fuselage of the aircraft and the underside of the wing. Although the aerodynamic drag is low with this design, the wing must be sized for the −1 g pushover flight condition as a cantilever wing, and the wing may be heavier to take the −1 g pushover flight condition as a cantilever wing. Under 1 g gravity conditions sitting on the ground, a downward deflection of the wing may cause the cable to droop. In an intermediate loading range, i.e., from 1 g on the ground to 1 g in flight, drooping cables on the wings may vibrate in an uncontrolled manner. Pre-stressing the cables to reduce or eliminate droop under the −1 g pushover flight condition may require larger connection hardware, increased bending in the wing, and increased compression in the wing box, which may result in unwanted weight.

Another challenge is configuring a structure that is able to fit within a thin strut and is able to expand and contract, or morph, within the strut during flight. An issue with morphing structures that morph from a thin cross section to a thick cross section is a "scissor jack phenomenon", which when collapsed may have a poor mechanical advantage, and when expanded may require large diagonal linkages to take a load substantially perpendicular to those linkages in the collapsed position.

In addition, structural chains, including power transmission structural chains to transmit power through tension, have been used in various vehicles, including automobiles and motorcycles, and in other applications. However, such structural chains are in tension and do not carry compression without buckling.

Further, structural chains may be extended and retracted using tension members, such as cables. However, the lengths of the tension members, such as the cables, do not extend or lengthen at the same rate as the lengths of the structural chains when the tension members, such as the cables wind around a spindle or torque tube. The rate of extension of the tension member, such as the cable, varies over time, that is, for every unit of increase or extension in the structural chain, the increase in the length of the tension member, such as the cable, is non-linear. Thus, the variation in length is non-linear. However, if linearization is attempted, induced stresses in the tension member, such as the cable, may be large.

Accordingly, there is a need in the art for a variable radius assembly and method for use with variable length structural members, such as a compression chains, to extend and retract a structure, such as a wing strut of an aircraft or another structure, to enable a desired non-linear variation of tension member lengths, such as cable lengths, to provide a non-linear rate of tension member length changes for a constant rotation of a spindle, to allow compression chain structures to carry compression without buckling, to avoid the "scissor jack phenomenon", to eliminate cable drooping without adding unwanted weight, to avoid excessive tension to the wing to prevent bending stresses, to provide a lower aerodynamic drag, and to provide advantages over known assemblies and methods.

SUMMARY

Example implementations of the present disclosure provide a variable radius assembly and a method of using the same. As discussed in the below detailed description, versions of the variable radius assembly and method may provide significant advantages over known assemblies and methods.

In a version of the disclosure, there is provided a variable radius assembly. The variable radius assembly comprises a spindle. The variable radius assembly further comprises at least one variable radius guide member coupled to, and driven by, the spindle. The at least one variable radius guide member has a spiral body with a variable radius. The variable radius assembly further comprises a tension member attached to the at least one variable radius guide member. The tension member is configured to wrap around the spiral body and is configured to attach to at least one variable length structural member.

The variable radius assembly further comprises at least one gear coupled to, and driven by, the spindle, and configured to drive the at least one variable length structural member. The variable radius assembly further comprises at least one rotational power source coupled to the spindle, and configured to rotate the spindle. The at least one variable radius guide member enables a tension member length change at a non-linear rate of change for a constant rate of rotation of the spindle, allowing the at least one variable length structural member to be braced by the tension member at an inclination angle to the at least one variable length structural member throughout a range of motion.

In another version of the disclosure, there is provided an aircraft having a wing strut with one or more variable radius assemblies. The aircraft comprises a fuselage, and two wings coupled to the fuselage, and extending from the fuselage opposite each other. The aircraft further comprises the wing strut attached to each of the two wings. The wing strut has a strut cross section with an airfoil shape.

The aircraft further comprises the one or more variable radius assemblies coupled to an interior of each wing strut. Each variable radius assembly comprises a spindle. Each variable radius assembly further comprises at least one variable radius guide member coupled to, and driven by, the spindle, and having a spiral body with a variable radius.

Each variable radius assembly further comprises a tension member attached to the at least one variable radius guide member. The tension member is configured to wrap around the spiral body. Each variable radius assembly further comprises at least one constant radius gear coupled to, and driven by, the spindle. Each variable radius assembly further comprises at least one rotational power source coupled to the spindle, and configured to rotate the spindle.

The aircraft further comprises one or more variable length structural members attached to the tension member of each of the one or more variable radius assemblies, and driven by the at least one constant radius gear. The one or more variable length structural members are configured to transition the wing strut between a contracted position and an extended position, and are configured to transition the strut cross section between a contracted airfoil shape and an extended airfoil shape.

The variable radius guide member of each of the one or more variable radius assemblies enables a tension member length change at a non-linear rate for a constant rate of rotation of the spindle, allowing the one or more variable length structural members to be braced by the tension member at an inclination angle to the one or more variable length structural members throughout a range of motion.

In another version of the disclosure, there is provided a method of extending and retracting a structure using one or more variable radius assemblies. The method comprises the step of coupling the one or more variable radius assemblies to the structure.

Each variable radius assembly comprises a spindle. Each variable radius assembly further comprises at least one variable radius guide member coupled to the spindle. The at least one variable radius guide member has a spiral body with a variable radius. Each variable radius assembly further comprises a tension member attached to the at least one variable radius guide member and attached to at least one variable length structural member. The tension member is configured to wrap around the spiral body. Each variable radius assembly further comprises at least one gear coupled to the spindle. Each variable radius assembly further comprises at least one rotational power source coupled to the spindle.

The method further comprises the step of rotating the spindle, using the at least one rotational power source, to drive the at least one variable radius guide member, and to drive the at least one gear The method further comprises the step of extending the tension member, with the variable radius guide member driven by the spindle, and enabling a tension member length change at a non-linear rate for a constant rate of rotation of the spindle.

The method further comprises the step of extending the at least one variable length structural member, with the at least one gear driven by the spindle, and allowing the at least one variable length structural member to be braced by the tension member at an inclination angle to the at least one variable length structural member throughout a range of motion. The method further comprises the step of extending the structure, by pushing the structure with the extending variable length structural member. The method further comprises the step of retracting the structure, by retracting the at least one variable length structural member, and retracting the tension member, using the one or more variable radius assemblies.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 1 is an illustration of a block diagram of an exemplary variable radius assembly of the disclosure, coupled to an exemplary structure;

FIG. 2A is an illustration of a front perspective view of an exemplary version of a variable radius assembly of the disclosure with an exemplary version of a tension member;

FIG. 2B is an illustration of a back perspective view of the variable radius assembly of FIG. 2A;

FIG. 2G is an illustration of a bottom view of the variable radius assembly of FIG. 2A, with a constant radius gear removed;

FIG. 2H is an illustration of a top view of the variable radius assembly of FIG. 2A;

FIG. 2I is an illustration of cross-sectional view of the variable radius assembly of FIG. 2H, taken along lines 2I-2I of FIG. 2H, where a spindle and a variable radius guide member are separate parts;

FIG. 2J is an illustration of a cross-sectional view of a variable radius assembly, where a spindle and a variable radius guide member are an integral part;

FIG. 4A is an illustration of a left outboard side view of a schematic diagram of a wing strut with exemplary variable radius assemblies of the disclosure, where the wing strut is in a fully extended position;

FIG. 4B is an illustration of a front view of a schematic diagram of a portion of the wing strut of FIG. 4A, showing variable length structural members, where the wing strut is in the fully extended position;

FIG. 4C is an illustration of a left outboard side view of a schematic diagram of the wing strut with exemplary variable radius assemblies of FIG. 4A, where the wing strut is in a fully contracted position;

FIG. 4D is an illustration of a front view of a schematic diagram of a portion of the wing strut of FIG. 4C, showing the variable length structural members, where the wing strut is in the fully contracted position;

FIG. 5A is an illustration of a graph of height versus width of a geometric arrangement;

FIG. 5B is an illustration of an enlarged view of box 5B of FIG. 5A;

FIG. 9A is an illustration of a graph of height versus width of a geometric arrangement, showing an initial position of a wing strut extending sequence;

FIG. 9B is an illustration of an enlarged view of box 9B of FIG. 9A;

FIG. 9C is an illustration of a graph of height versus width of the geometric arrangement of FIG. 9A, showing an intermediate position of the wing strut extending sequence;

FIG. 9D is an illustration of an enlarged view of box 9D of FIG. 9C;

FIG. 10C is an illustration of a graph of height versus width of the geometric arrangement of FIG. 10A, showing an intermediate position of the wing strut retracting sequence;

FIG. 10D is an illustration of an enlarged view of box 10D of FIG. 10C;

Figure 2C:
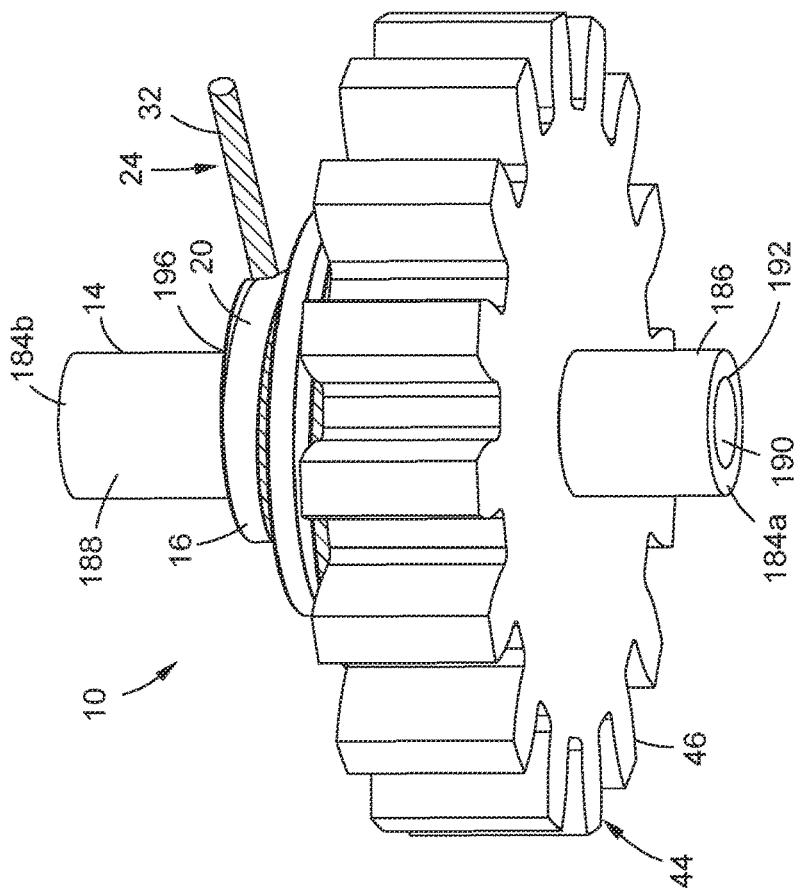
FIG. 2C is an illustration of a bottom perspective view of the variable radius assembly of FIG. 2A.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary variable radius assembly 10 of the disclosure, used with an exemplary structure 12. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the variable radius assembly 10 in FIG. 1 are not meant to imply physical or architectural limitations to the manner in which an illustrative example may be implemented. Other components in addition to, or in place of, the ones illustrated may be used. Some components may be unnecessary.

In one version, there is provided the variable radius assembly 10 (see FIGS. 1, 2A). As shown in FIG. 1, the variable radius assembly 10 comprises a spindle 14. As shown in FIG. 1, the variable radius assembly 10 further comprises at least one variable radius guide member 16 coupled to, or integral with, the spindle 14, and driven by, the spindle 14. In one version, as shown in FIG. 2I, one of the at least one variable radius guide members 16 and the spindle 14 are separate parts 15 that are coupled together, such as where the variable radius guide member 16 is coupled to the spindle 14. In another version, as shown in FIG. 2J, the variable radius guide member 16 and the spindle 14 are an integral part 17 integrated into a single unitary part. In one form, as shown in FIG. 2A, and discussed in further detail below, the variable radius guide member 16, comprises a variable radius spiral guide member 16a, having a first end 18a, a second end 18b, and a spiral body 20 (see also FIG. 1) formed between the first end 18a and the second end 18b. The spiral body 20 has a variable radius 22 (see FIGS. 1, 2H).

As shown in FIG. 1, the variable radius assembly 10 further comprises a tension member 24 having a tension member length (TML) 26. The variable radius guide member 16 enables a tension member length (TML) change 26a (see FIG. 1) of the tension member length 26 of the tension member 24 at a non-linear rate 28 (see FIG. 1). The tension member 24 is attached to the at least one variable radius guide member 16. The tension member 24 is configured to wrap around, and wraps around, the spiral body 20 of the variable radius guide member 16. The tension member 24 is further configured to attach, and is attached, to at least one variable length structural member 30 (see FIG. 1).

As shown in FIG. 1, the tension member 24 comprises one of, a cable 32, a cord 34, a wire 36, or an assembly 38 comprising a rod 40 coupled, or joined, via a connector element 42, to one of, the cable 32, the cord 34, or the wire 36. With the assembly 38, a portion 24a (see FIG. 2B) at a second end 212b (see FIG. 2B) of the tension member 24, such as one of, the cable 32, the cord 34, or the wire 36, is substituted, or replaced, with the rod 40 (see FIG. 2J), and the rod 40 is coupled, or joined, via the connector element 42, to a remaining portion 24b (see FIGS. 2B, 2J) of the tension member 24, such as one of, the cable 32, the cord 34, or the wire 36. The cable 32, cord 34, or wire 36 is a flexible portion 39 (see FIGS. 2A, 2J) configured to wrap around, and wraps around, the spiral body 20 of the variable radius guide member 16, and the rod 40 is a straight portion 41 (see FIG. 2J) that is stiff and configured to brace, and braces, the variable length structural member 30 (see FIG. 1) at an inclination angle 86 (see FIG. 1) to the variable length structural member 30 throughout a range of motion 88 (see FIG. 1) of the tension member 24 and the variable length structural member 30.

Figure 2D:
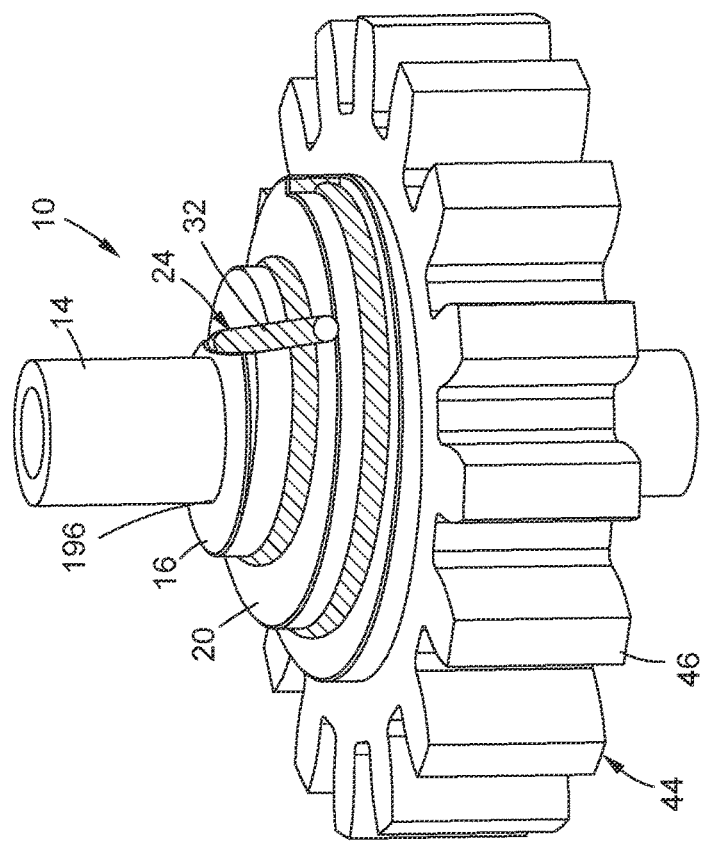
FIG. 2D is an illustration of a right side top perspective of the variable radius assembly of FIG. 2A.
Figure 2F:
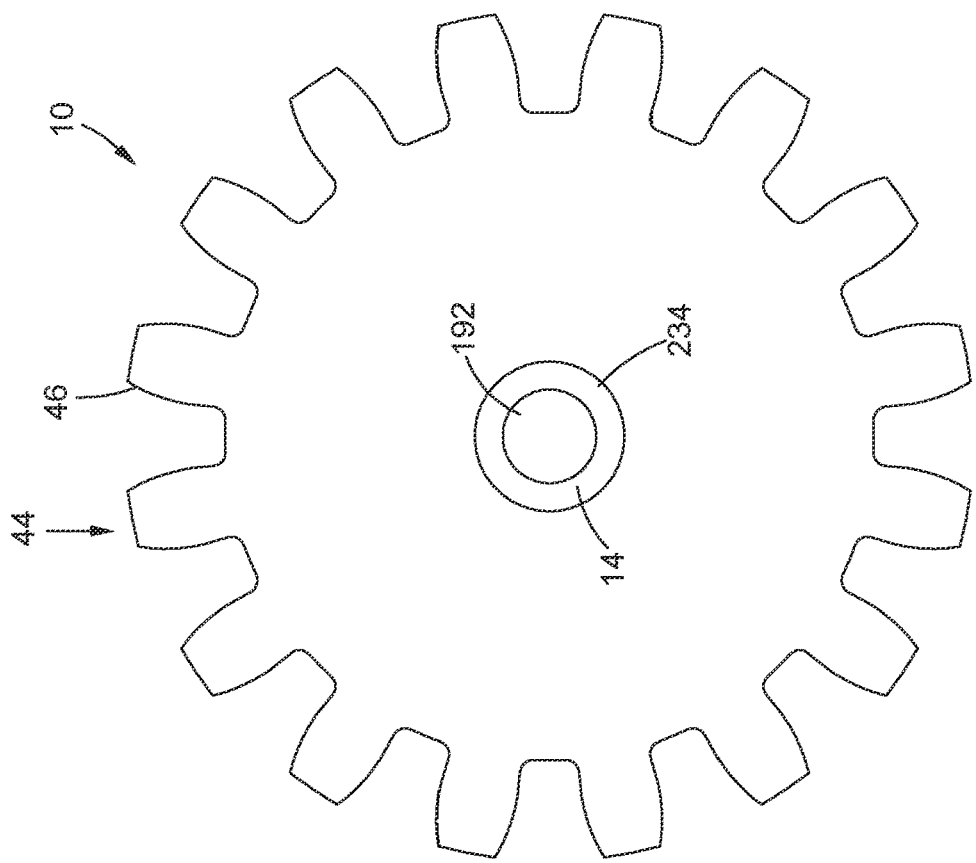
FIG. 2F is an illustration of a bottom view of the variable radius assembly of FIG. 2A.
Figure 2E:
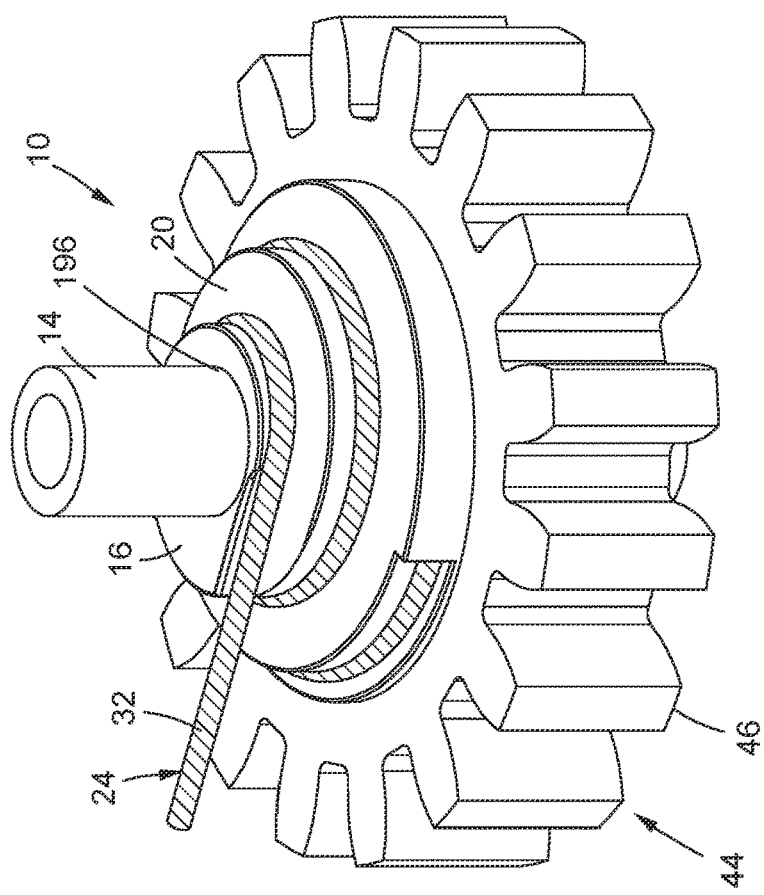
FIG. 2E is an illustration of a front top perspective of the variable radius assembly of FIG. 2A.
Figure 2K:
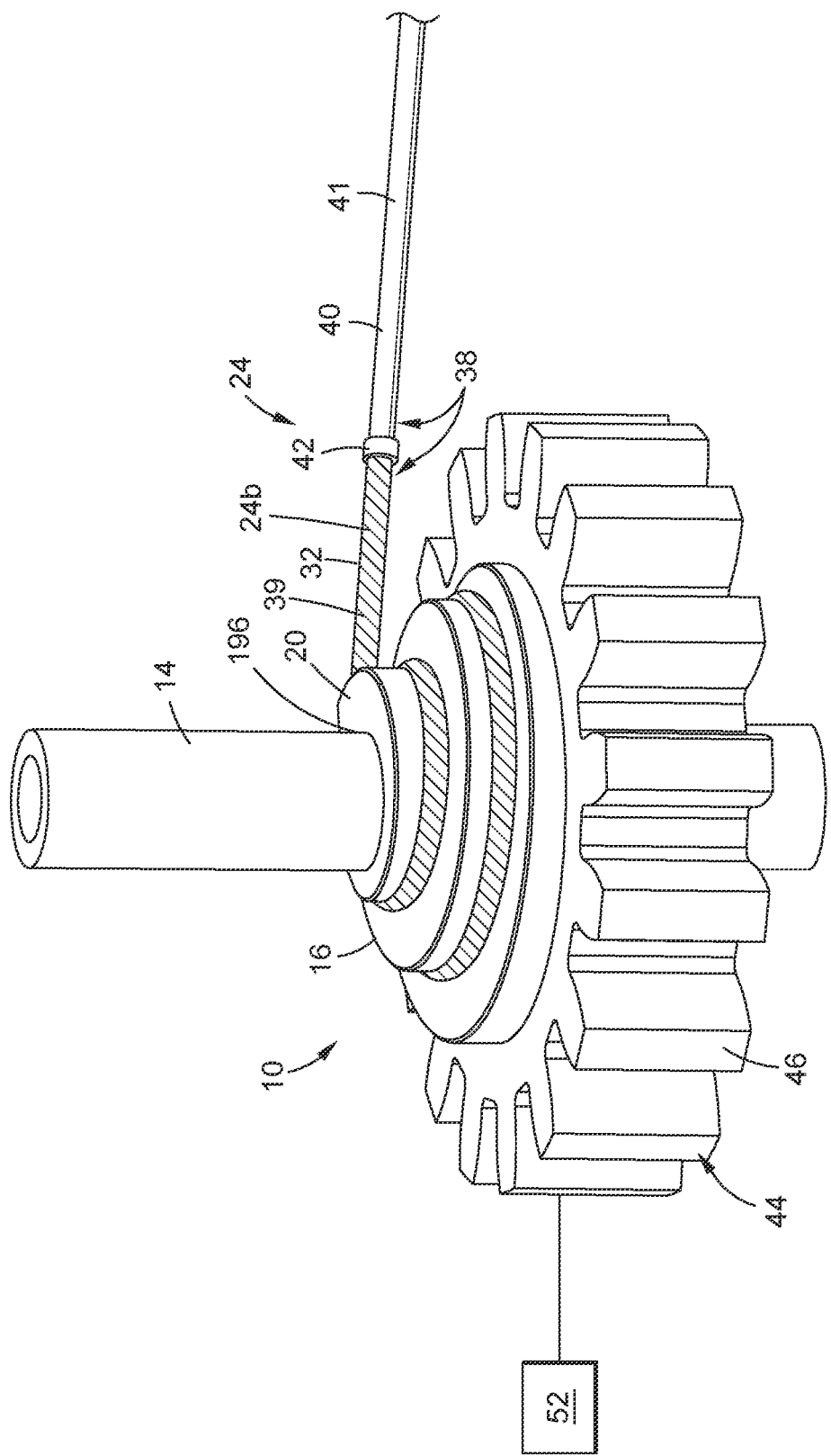
FIG. 2K is an illustration of a front perspective view of an exemplary version of a variable radius assembly of the disclosure, with another exemplary version of a tension member.

In one example, as shown in FIG. 2K, the assembly 38 comprises the rod 40 coupled, or joined, to the cable 32, via the connector element 42. In another example, the assembly 38 comprises the rod 40 coupled, or joined, to the cord 34, via the connector element 42. In another example, the assembly 38 comprises the rod 40 coupled, or joined, to the wire 36, via the connector element 42. The connector element 42 may comprise a coaxial connector, a fitting, a plug, a sleeve, or another suitable type of connector element to couple, join, or connect the rod 40 together with one of, the cable 32, the cord 34, or the wire 36. The tension member 24 may further comprise another suitable tension member.

Figure 2L:
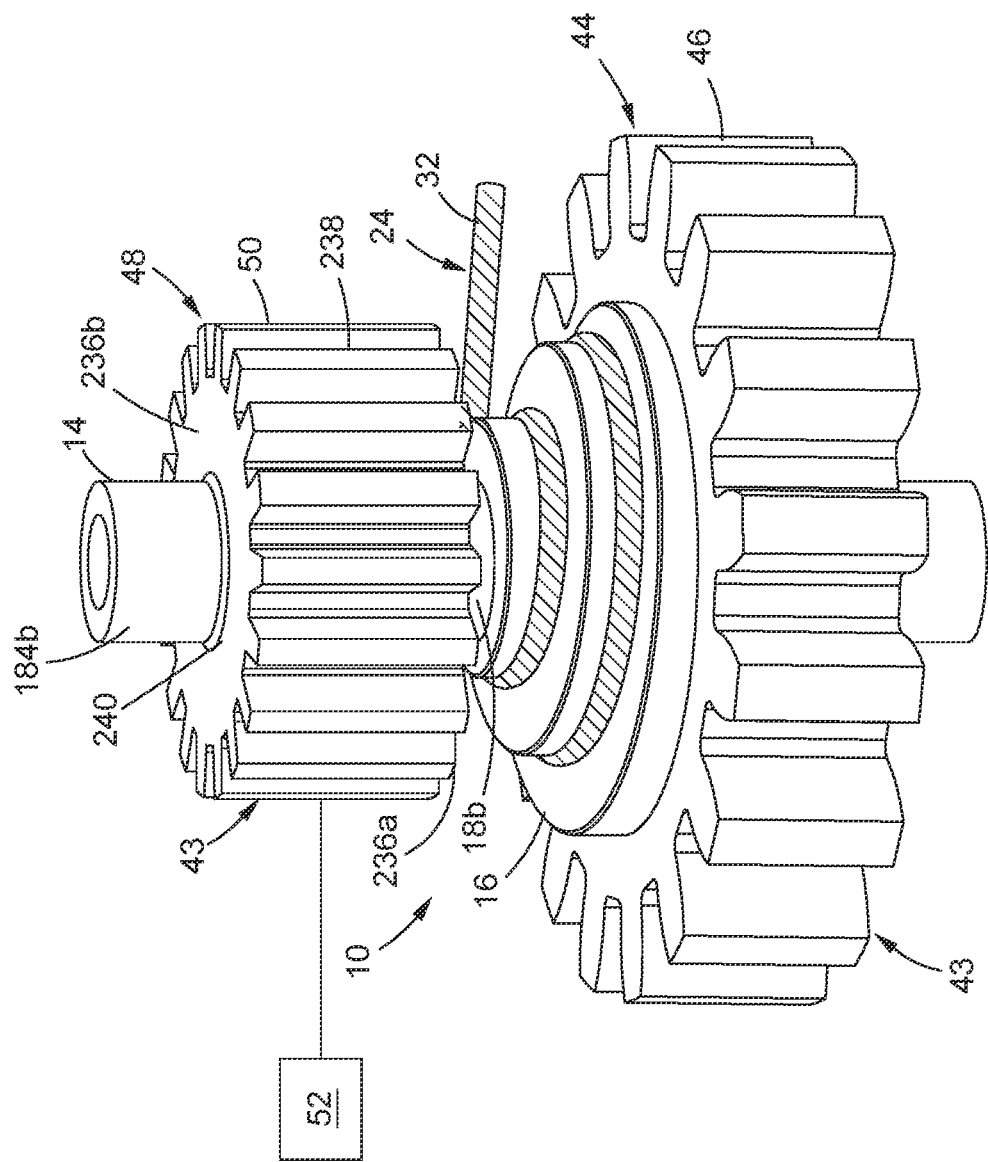
FIG. 2L is an illustration of a front perspective view of an exemplary version of a variable radius assembly of the disclosure with a second gear.

As shown in FIG. 1, the variable radius assembly 10 further comprises at least one gear 43, or one or more gears 43, each with gear teeth, coupled to, and driven by, the spindle 14. As shown in FIG. 1, the at least one gear 43 is coupled to, and driven by, the spindle 14, and is configured to drive the at least one variable length structural member 30. As shown in FIG. 1, the at least one gear 43 comprises at least one first gear 44, such as at least one constant radius gear 46, coupled to, and driven by, the spindle 14. The first gear 44 (see FIG. 2A), such as the constant radius gear 46 (see FIG. 2A), is configured to drive, and drives, the at least one variable length structural member 30. As shown in FIG. 1, the variable radius assembly 10 may further optionally comprise a gear 43, such as a second gear 48, for example, a drive gear 50, coupled to, and driven by, the spindle 14. The gear 43 may further comprise a variable radius gear with a variable radius instead of a constant radius. In one version, as shown in FIGS. 2A-2K, the spindle 14 has the first gear 44, such as the constant radius gear 46, that both drives the at least one variable length structural member 30, and that is driven by at least one rotational power source 52 (see FIG. 1). In another version, as shown in FIG. 2L, the spindle 14 has both the first gear 44, such as the constant radius gear 46, and the second gear 48, such as the drive gear 50. In this version, the first gear 44, such as the constant radius gear 46 drives the at least one variable length structural member 30, and the second gear 48, such as the drive gear 50, is driven by the least one rotational power source 52. In other versions, the variable radius assembly 10 may comprise more the two gears 43. The gear 43 has a gear radius and the variable radius guide member 16 has a variable radius 22 (see FIG. 1), and the ratio of the gear radius to the variable radius 22 vary as they rotate.

As shown in FIG. 1, the variable radius assembly 10 further comprises the at least one rotational power source 52 coupled to the spindle 14, such as via the gear 43, for example, the first gear 44, in the form of the constant radius gear 46. The rotational power source 52 is configured to rotate, and rotates, the spindle 14. In one version, as shown in FIG. 1, the at least one rotational power source 52 comprises at least one torque tube 54 with at least one intermediary gear 56 attached to the torque tube 54. The at least one intermediary gear 56 has intermediary gear teeth 58 (see FIG. 5A) configured to mesh with, and meshing with, constant radius gear teeth 60 (see FIG. 5A) of the at least one constant radius gear 46 (see FIG. 5A).

As shown in FIG. 1, the rotational power source 52 may further comprise at least one spine member 62, or one or more spine members 62, coupled to the spindle 14. The rotational power source 52 may further comprise another suitable rotational power source to provide rotational power or rotational moment to the spindle 14.

As shown in FIG. 1, the torque tube 54 or the spine member 62 may be coupled to a mechanical power apparatus 64 that drives, moves, or actuates each torque tube 54 or spine member 62. As shown in FIG. 1, the mechanical power apparatus 64 may comprise a motor 66, a rack-and-pinion system 68, or another suitable mechanical power apparatus. The motor 66 may comprise an electric motor powered by electricity, a battery operated motor powered by a battery, a pneumatic operated motor powered by a pneumatic system, or another suitable type of mechanical power apparatus powered by a power source. The mechanical power apparatus 64 may further comprise a hydraulic actuated mechanical power apparatus.

As shown in FIG. 1, the at least one variable length structural member 30, such as one or more variable length structural members 30, comprise one of, at least one compression chain 70 or one or more compression chains 70, at least one cam element 72 or one or more cam elements 72, at least one spring 74 or one or more springs 74, at least one telescoping structural compression member 78 or one or more telescoping structural compression members 78, or another suitable variable length structure member. The at least one variable length structural member 30 is configured to move, and moves, from a retracted position 80 (see FIG. 1) to an extended position 82 (see FIG. 1), to extend the structure 12 (see FIG. 1) coupled to the at least one variable length structural member 30, and to retract the structure 12.

The at least one variable radius guide member 16 enables a tension member length change 26a of the tension member length 26 of the tension member 24 at the non-linear rate 28 (see FIG. 1) for a constant rate of rotation 84 (see FIG. 1) of the spindle 14. This allows the at least one variable length structural member 30 to be braced by the tension member 24 at the inclination angle 86 (see FIG. 1) to the at least one variable length structural member 30 throughout the range of motion 88 (see FIG. 1) of the tension member 24 and the variable length structural member 30. The non-linear rate 28 of the tension member length change 26a of the tension member length 26 is a function of an inclination angle alpha (α) 86a (see FIG. 7), which to a first order of approximation is equal or proportional to the sine of inclination angle alpha (α) 86a.

As shown in FIG. 1, the at least one variable length structural member 30 coupled to the variable radius assembly 10 is also coupled, or attached, to the structure 12, which is extended and retracted by the variable length structural member 30 and the variable radius assembly 10. As shown in FIG. 1, in one version, the structure 12 comprises a wing strut 90 for a wing 92 of a vehicle 94, such as an aircraft 94a. In one version, the wing strut 90 may further include a jury strut 96 (see FIGS. 1, 3B) positioned between the wing 92 and the wing strut 90. The wing strut 90 has an interior 98 (see FIGS. 3A-3B) and an exterior 100 (see FIGS. 3A-3B) and a thickness 91 (see FIG. 1). As shown in FIG. 1, the wing strut 90 further has a strut cross section (CS) 102 with a thickness 103 and an airfoil (AF) shape 104. The variable length structural member 30 is configured to move, and moves, from the retracted position 80 (see FIG. 1) to the extended position 82 (see FIG. 1), to extend, or expand, the thickness 103 of the strut cross section 102 from a contracted airfoil shape 106 (see FIG. 4C), such as a fully contracted airfoil shape 106a (see FIG. 4C), to an extended airfoil shape 108 (see FIG. 4A), such as a fully extended airfoil shape 108a (see FIG. 4A), and to extend, or expand, the thickness 91 of the wing strut 90 from a contracted position 110 (see FIG. 4C), such as a fully contracted position 110a (see FIG. 4C), to an extended position 112 (see FIG. 4A), such as a fully extended position 112a (see FIG. 4A).

As used herein, with respect to the wing strut 90 and the strut cross section 102, "contract" or "retract" means to cause a height 114 (see FIG. 1, 4C) or thickness 91 (see FIG. 1) of the wing strut 90 and the thickness 103 (see FIG. 1) of the strut cross section 102 with the airfoil shape 104 to become thinner or smaller. The fully contracted position 110a (see FIG. 4C), or fully retracted position, is the strut cross section 102 (see FIG. 4C) and the thickness 91 of the wing strut 90 (see FIG. 4C) at the thinnest or smallest height 114 (see FIG. 1). As used herein, "extend" or "expand" means to cause the height 114 (see FIG. 1, 4A) or thickness 91 of the wing strut 90 and the thickness 103 of the strut cross section 102 with the airfoil shape 104 to get thicker or larger. The fully extended position 112a (see FIG. 4A), or fully expanded position, is the thickness 103 of the strut cross section 102 (see FIG. 4A) and the thickness 91 of the wing strut 90 at the thickest or largest height 114 (see FIG. 4A).

The vehicle 94, such as the aircraft 94a, experiences load conditions 115 (see FIG. 1) when on the ground and when in flight. When the aircraft 94a is on the ground, the aircraft 94a is in, or at, a 1 g on ground condition 116 (see FIG. 1). As used herein "g" means gravitational force. The gravitational force is attractive and a downward force toward the center of the earth, and forces on the landing gear of the aircraft 94a are upward forces and are a reaction against the downward force. The 1 g on ground condition 116 results in compression 118 (see FIG. 1) in the wing strut 90 (see FIG. 1) because the dead weight of the wing 92 (see FIG. 1) from the downward force of gravity makes the wing 92 tend to sag or deflect downward, and thus the length of the wing strut 90 tends to shorten. The downward load is reacted upward by the landing gear.

When the aircraft 94a is in flight, the aircraft 94a, can be in a cruise flight condition 120 (see FIG. 1). The cruise flight condition 120 is typically a steady 1.0 g condition flight with a small amount of turbulence. Further, when the aircraft 94a is in flight, the aircraft 94a may be in an intermediate flight condition 122 (see FIG. 1). The intermediate flight condition 122 may be a 0.5 g condition, where a lower load threshold is a 0.3 g condition and an upper load threshold is a 0.7 g condition. In the intermediate flight condition 122, the aircraft 94a may be on its way to a minus 1 g (−1 g) pushover flight condition 124 (see FIG. 1).

In the minus 1 g pushover flight condition 124 (see FIG. 1), the wing 92 is bending down, such as in a wing down-bending flight condition (COND.) 125 and the direction of weight-force is opposite to the direction of g-force acceleration. The wing strut 90 (see FIG. 1) is designed for the minus 1 g pushover flight condition 124, as the minus 1 g pushover flight condition 124 puts the wing strut 90 into compression 118 (see FIG. 1), such as axial compression. In the minus 1 g pushover flight condition 124, an upward acceleration on the vehicle 94 is balanced by a downward force on the wing 92 from the air load pressures on the wing 92. This tends to bend the wing 92 downward and shorten a length of the wing strut 90.

Further, when the aircraft 94a is in flight, the aircraft 94a may be in, or at, for example, a 2.5 g up-bending of wing flight condition (COND.) 126 (see FIG. 1), when the wing 92 is bending up. For up-bending of the wing flight conditions, a vertical acceleration of the aircraft 94a is a factor. In the 2.5 g up-bending of wing flight condition 126, the air load on the wing 92 is in the upward direction. It is balanced by the weight of the aircraft 94a in the downward direction. The 2.5 g up-bending of wing flight condition 126 is a flight maneuver that imparts 2.5 times the force of gravity as a downward acceleration on the vehicle 94, which is reacted by the upward force on the wing 92. This tends to lengthen the wing strut 90, which puts it in tension 128 (see FIG. 1).

The strut cross section 102 of the wing strut 90 becomes thick or large, when the wing strut 90 is in compression 118 (see FIG. 1), when the aircraft 94a is in the 1 g on ground condition 116 (see FIG. 1), or in the minus 1 g pushover flight condition 124 (see FIG. 1). The wing strut 90 having the strut cross section 102 that becomes thick or large has a larger buckling load, which is sufficient to withstand axial compression load from the minus 1 g pushover flight condition 124 (see FIG. 1).

Figures 10A, 10B:
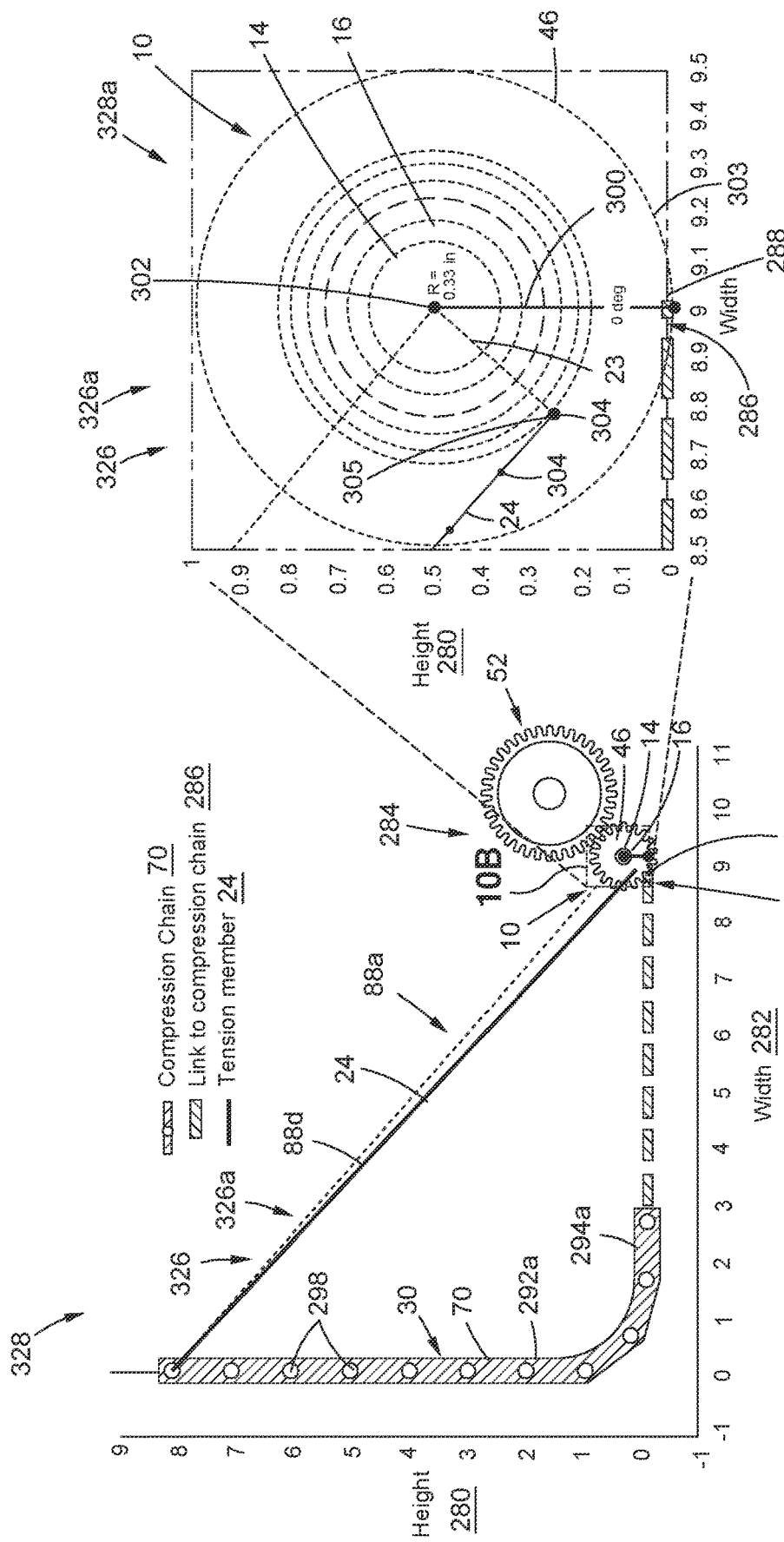
FIG. 10A is an illustration of a graph of height versus width of a geometric arrangement, showing an initial position of a wing strut retracting sequence.
FIG. 10B is an illustration of an enlarged view of box 10B of FIG. 10A.

The strut cross section 102 of the wing strut 90 becomes thin or small, when the aircraft 94a is in the cruise flight condition 120 (see FIGS. 1, 10A). As shown in FIG. 10A, the wing strut 90 is in the contracted position 110, such as a fully contracted position 110a, and the strut cross section 102 is in the contracted airfoil shape 106, such as a fully contracted airfoil shape 106a, during the cruise flight condition 120 of the aircraft 94a. The wing strut 90 that is thin or small enables lower drag.

During the cruise flight condition 120 (see FIG. 10A), for example, in a load condition range of greater than 0.7 g condition to 1.3 g condition, the wing strut 90 (see FIGS. 1, 8A, 10A) for the wing 92 (see FIGS. 1, 8A) is in tension 128 (see FIG. 1). The thickness 91 (see FIG. 1) of the wing strut 90 and the thickness 103 (see FIG. 1) of the strut cross section 102 (see FIGS. 1, 9A, 10A) are preferably extended, or expanded, between the 0.7 g condition and the 0.3 g condition, so that the wing strut 90 is prepared to take axial compression load by the time the axial compression load is applied, when the wing strut 90 is in compression 118 (see FIG. 1). The variable radius assembly 10 and the compression chains 70 disclosed herein help to avoid a wing strut 90 and strut cross section 102 that are thick during the cruise flight condition 120, and help to avoid a wing strut 90 and a strut cross section 102 that are thin during the minus 1 g pushover flight condition 124.

As shown in, FIG. 10C, the wing strut 90 is in the extended position 112, such as the fully extended position 112a, and the strut cross section 102 has the extended airfoil shape 108, such as the fully extended airfoil shape 108a, for example, when the wing strut 90 is in compression 118 (see FIG. 1), or under a strut compression load, during the minus 1 g pushover flight condition 124 (see FIG. 4A) or the wing down-bending flight condition 125 (see FIG. 1) of the aircraft 94a. Further, the wing strut 90 may be in the extended position 112, and the strut cross section 102 may be in the extended airfoil shape 108, in a range of tension 128 (see FIG. 1), so that they are expanded by the time the wing strut 90 goes into compression 118.

The thickness 103 (see FIG. 1) of the strut cross section 102 (see FIG. 1) of the wing strut 90 is configured to transition in shape between the contracted airfoil shape 106 (see FIG. 10A), such as the fully contracted airfoil shape 106a (see FIG. 10A), and the extended airfoil shape 108 (see FIG. 10C), such as the fully extended airfoil shape 108a (see FIG. 10C). Thus, the strut cross section 102 extends or expands from the strut cross section 102 (see FIG. 1) that is thin or small to the strut cross section 102 that is thick or large, and retracts or contracts from the strut cross section 102 that is thick or large to the strut cross section 102 that is thin or small. The expansion of the strut cross section 102 is driven by axial load in the wing strut 90, such as strut axial load, in tension 128 (see FIG. 1) and compression 118 (see FIG. 1). This allows for a wing strut 90 that is lightweight to carry the required axial compression loads for wing down-bending flight conditions 125 (see FIG. 1), but enables a more aerodynamically efficient small strut cross section 102 for the cruise flight condition 120 (see FIG. 1) portions of the flight. The wing strut 90 is able to carry compression 118, and the wing strut 90, such as the wing strut 90 that is thin or small, has the capability to become thick or large to withstand axial compression loads.

Figure 3A:
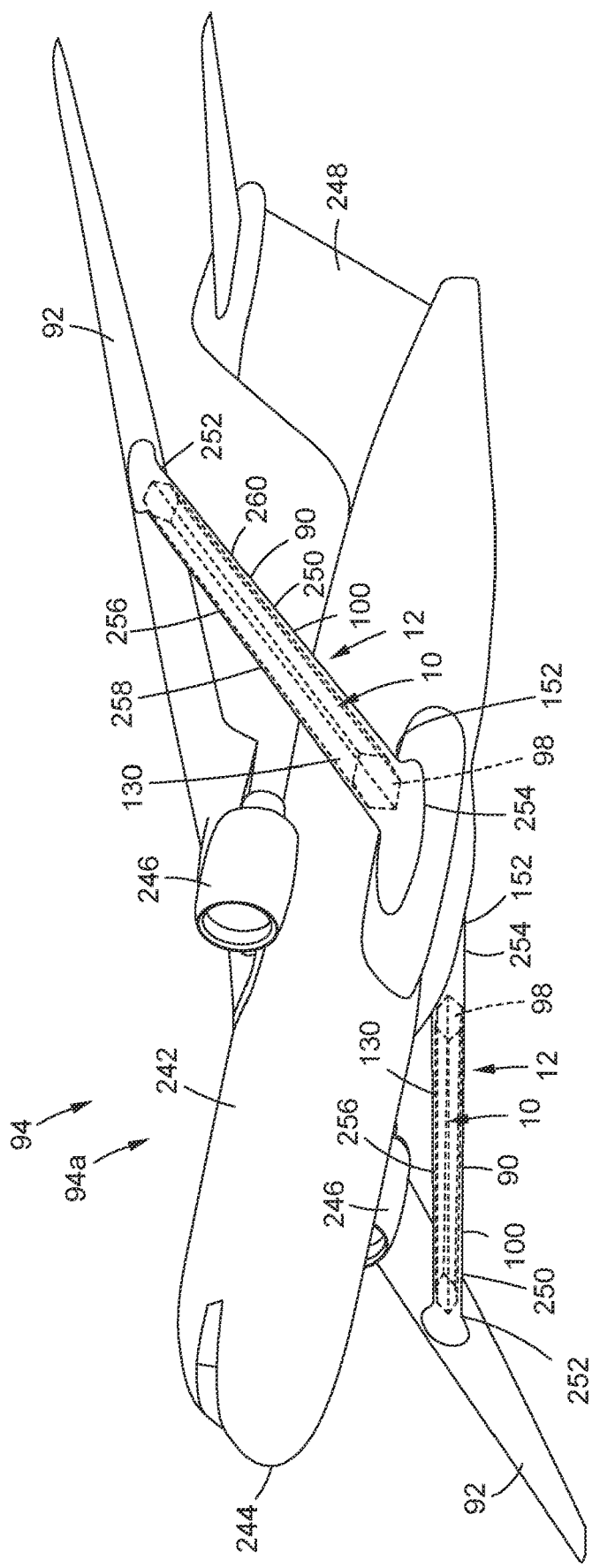
FIG. 3A is an illustration of a front perspective view of an exemplary aircraft having wing struts with exemplary variable radius assemblies of the disclosure.
Figure 3B:
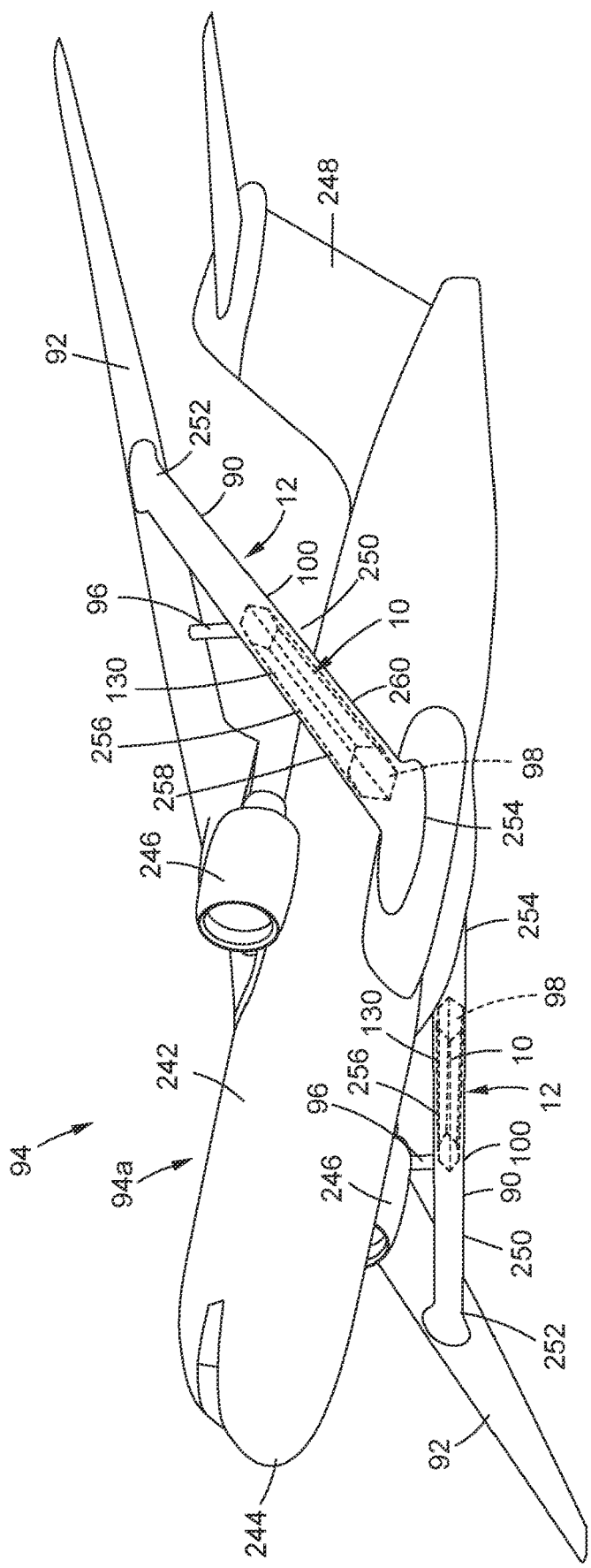
FIG. 3B is an illustration of a front perspective view of the aircraft of FIG. 3A, with wing struts and variable radius assemblies, and further including jury struts.
Figure 4E:
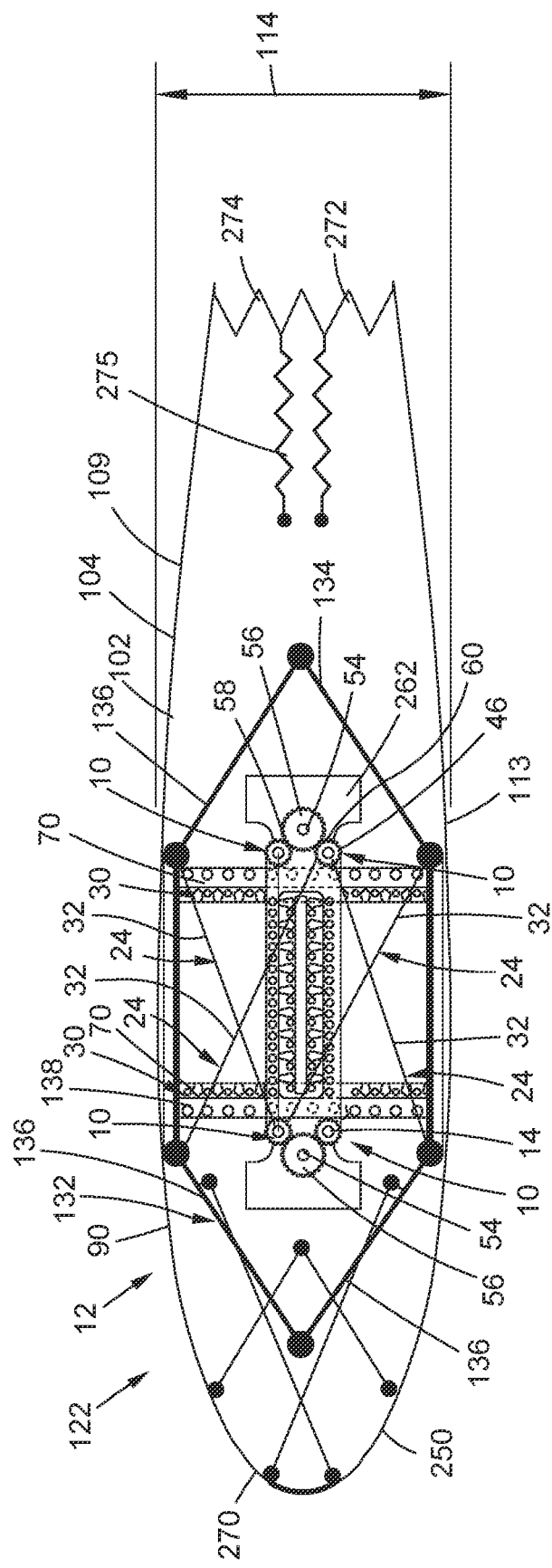
FIG. 4E is an illustration of a left outboard side view of a schematic diagram of the wing strut with exemplary variable radius assemblies of FIG. 4A, where the wing strut is in an intermediate extended position.

In one version, as shown in FIGS. 4A, 4C, 4E, the variable radius assemblies 10 and the variable length structural members 30 are part of a shape transition assembly 130 (see also FIG. 1) coupled to the interior 98 (see FIGS. 3A-3B) of the wing strut 90 (see FIGS. 3A-3B). As shown in FIGS. 1, 4A, 4C, 4E, the shape transition assembly 130 comprises a shape transition mechanism 132 with an expandable structure 134 (see FIGS. 4A, 4C, 4E). The expandable structure 134 is comprised of fixed length structural members 136 (see FIGS. 4A, 4C, 4E) and a drive mechanism 138 (see FIGS. 4A, 4C, 4E) comprised of the variable length structural members 30 (see FIGS. 4A-4E), such as in the form of compression chains 70 (see FIGS. 4A-4E). As shown in FIGS. 4A, 4C, 4E, the torque tubes 54 with the intermediary gears 56 and the variable radius assemblies 10 form an actuation mechanism 140.

As shown in FIG. 1, the shape transition assembly 130 further comprises an activation mechanism (ACTIV. MECH.) 142. In the version of the shape transition assembly 130 with the variable radius assemblies 10 and the variable length structural members 30, the activation mechanism 142 may comprise a sensor activation mechanism (ACTIV. MECH.) 144 (see FIG. 1), a strut axial load driven activation mechanism (ACTIV. MECH.) 145 (see FIG. 1), or a wing rotation system 146 (see FIG. 1). The wing rotation system 146 converts wing rotations 148 (see FIG. 1) of the wing 92 (see FIGS. 1, 3A-3B) to horizontal movement 150 (see FIG. 1) at a strut root 152 (see FIG. 3A) of the wing strut 90 (see FIGS. 1, 3A), to activate the actuation mechanism 140, for example, the torque tubes 54 and the variable radius assemblies 10, to move, drive, advance, or actuate the drive mechanism 138 in the form of the variable length structural members 30, for example, the compression chains 70 (see FIGS. 4A-4E).

The variable radius assemblies 10 and the variable length structural members 30, for example, the compression chains 70, enable the wing strut 90 to increase the thickness 91 (see FIG. 1) of the wing strut 90 during flight, thus allowing the wing strut 90 to be thin and have lower drag during the cruise flight condition 120 (see FIGS. 1, 4C), but enable the wing strut 90 to carry axial compression loads during the minus 1 g pushover flight condition 124 (see FIGS. 1, 4A).

As shown in FIG. 1, in another version, the structure 12 comprises an object 154 movable from, and between, an underground position (POS.) 156, to an above ground position (POS.) 158. The variable radius assemblies 10 are coupled to the variable length structural members 30, which are directly are coupled to the structure 12 comprising the object 154 (see also FIG. 1). As shown in FIG. 1, the object 154 comprises a support structure 160 with a sensor device 162, a surveillance apparatus (APP.) 164 (see FIG. 1), a weapon 166 (see FIG. 1), or another suitable object. The object 154, such as the support structure 160, can be hidden in an underground structure (STRUC.) 168 (see FIG. 1), such as an underground compartment, or in underground trench, and when desired, the object 154 can be extended from the underground position 156 to the one or more above ground positions 158, with the variable radius assemblies 10 and the variable length structural members 30, to operate the sensor device 162 (see FIG. 1), or the surveillance apparatus 164 (see FIG. 1), or the weapon 166 (see FIG. 1). Once the sensor device 162, or the surveillance apparatus 164, or the weapon 166, has been used, the variable length structural members 30 and the variable radius assemblies 10 can retract the support structure 160 back into the underground structure 168, such as the underground compartment, or an underground trench, to disappear out of sight.

As further shown in FIG. 1, in another version, the structure 12 comprises a variable elevation platform 170, including in the form of a stage platform 172. Variable elevation platforms 170 that can quickly vary their height may be advantageously extended and retracted using the variable length structural members 30 and the variable radius assemblies 10 disclosed herein. The variable elevation platforms 170, including in the form of stage platforms 172, may be used for concerts, stage plays, and other entertainment events.

As shown in FIG. 1, in other versions, the structure 12 comprises an extendable ladder 174, an extendable mast 176, an extendable pole 178, a periscope 180 for a submarine vehicle 182, or another suitable structure that may be extended and retracted using the variable length structural members 30 and the variable radius assemblies 10 disclosed herein. For example, the extendable ladder 174 may be extended and retracted with the variable length structural members 30 and the variable radius assemblies 10 and used to access tall buildings and other tall structures. Further, the extendable mast 176 may be extended and retracted with the variable length structural members 30 and the variable radius assemblies 10 and used to raise and lower masts on sailboats, yachts, or other water vessels, and to facilitate storage, maintenance, repair, and transport under bridges and other low structures, of such sailboats, yachts, and water vessels. Further, the extendable pole 178 may be extended and retracted with the variable length structural members 30 and the variable radius assemblies 10 and used to access utility poles or other types of poles for maintenance and repair of such utility poles and other types of poles. Further, the periscope 180 for the submarine vehicle 182 may be extended and retracted with the variable length structural members 30 and the variable radius assemblies 10.

Now referring to FIGS. 2A-2L, FIGS. 2A-2L show exemplary versions of the variable radius assembly 10 of the disclosure. FIG. 2A is an illustration of a front perspective view of an exemplary version of a variable radius assembly 10 of the disclosure with an exemplary version of a tension member. FIG. 2B is an illustration of a back perspective view of the variable radius assembly 10 of FIG. 2A. FIG. 2C is an illustration of a bottom perspective view of the variable radius assembly 10 of FIG. 2A. FIG. 2D is an illustration of a right side top perspective of the variable radius assembly 10 of FIG. 2A. FIG. 2E is an illustration of a front top perspective of the variable radius assembly 10 of FIG. 2A. FIG. 2F is an illustration of a bottom view of the variable radius assembly 10 of FIG. 2A. FIG. 2G is an illustration of a bottom view of the variable radius assembly 10 of FIG. 2A, with a constant radius gear 46 of FIGS. 2A-2F removed for clarity. FIG. 2H is an illustration of a top view of the variable radius assembly 10 of FIG. 2A. FIG. 2I is an illustration of cross-sectional view of the variable radius assembly 10 of FIG. 2H, taken along lines 2I-2I of FIG. 2H, where a spindle 14 and a variable radius guide member 16 are separate parts 15.

FIG. 2J is an illustration of a cross-sectional view of a variable radius assembly 10, where the spindle 14 and a variable radius guide member 16 are an integral part 17. FIG. 2K is an illustration of a front perspective view of an exemplary version of a variable radius assembly 10 of the disclosure, with another exemplary version of a tension member 24, such as in the form of the assembly 38 comprising the rod 40 coupled, or joined, to the cable 32, via the connector element 42. FIG. 2L is an illustration of a front perspective view of an exemplary version of a variable radius assembly 10 of the disclosure with a second gear 48, such as a drive gear 50 in addition to the first gear 44, such as the constant radius gear 46.

As shown in FIGS. 2A-2L, the variable radius assembly 10 comprises the spindle 14, the variable radius guide member 16 coupled to, and driven by, the spindle 14, the tension member 24, the first gear 44, such as the constant radius gear 46. FIGS. 2A and 2K further show the rotational power source 52 coupled to the spindle 14, via the first gear 44, such as the constant radius gear 46. FIG. 2L shows the rotational power source 52 coupled to the spindle 14, via the second gear 48. The rotational power source 52 is also part of the variable radius assembly 10 of FIGS. 2B-2I but is not shown for clarity. In one version, as shown in FIGS. 2A-2J, 2L, the tension member 24 comprises the cable 32. In another version, as shown in FIG. 2K, the tension member 24 comprises the assembly 38 comprising the rod 40 coupled, or joined, to the cable 32, via the connector element 42. FIG. 2L shows an additional optional second gear 48, such as the drive gear 50, coupled to the spindle 14 of the variable radius assembly 10.

As shown in FIGS. 2C, 2I, 2J, the spindle 14 has a first spindle end 184a, a second spindle end 184b, and a body 186 formed between the first spindle end 184a and the second spindle end 184b. The body 186 of the spindle 14 may be cylindrical, or the body 186 may be noncylindrical where the radius of the first spindle end 184a is different from the radius of the second spindle end 184b. As further shown in FIGS. 2C, 2I, 2J, the spindle has an exterior 188, an interior 190, and a central through hole 192 (see also FIGS. 2F, 2G) formed through the interior 190 of the spindle 14. In one version, the spindle 14 has the central through hole 192 (see FIGS. 2I, 2J) and is substantially hollow. The central through hole 192 may be designed to receive an apparatus or structure. In another version, the spindle 14 does not have the central through hole 192 and is solid. In yet another version, the spindle 14 may be a hybrid in that part of the spindle 14 is hollow and part of the spindle 14 is solid. The spindle 14 may further comprise another suitable structure or configuration known to one skilled in the art. FIGS. 2A-2L show one spindle 14. However, more than one spindle 14 may be coupled together in line with each other.

As shown in FIGS. 2A, 2I, the variable radius guide member 16 comprises a variable radius spiral guide member 16a, coupled to the spindle 14. In one version, as shown in FIG. 2I, the variable radius guide member 16 and the spindle 14 are separate parts 15 coupled together, such as where the variable radius guide member 16 is coupled to the spindle 14. In another version, as shown in FIG. 2J, the variable radius guide member 16 and the spindle 14 are an integral part 17 integrated into a single unitary part.

As further shown in FIGS. 2A, 2I, the variable radius guide member 16 has the first end 18a (see also FIG. 2G), the second end 18b, and the spiral body 20 (see also FIG. 2H) formed between the first end 18a and the second end 18b. As shown in FIG. 2G, the first end 18a of the variable radius guide member 16 is flat like a flat plate and has a circular shape 193.

The spiral body 20 has the variable radius 22 (see FIGS. 1, 2H). As shown in FIG. 2H, the variable radius 22 of the spiral body 20 comprises multiple radii 23 of lengths 194 that vary, for example, a first radius 23a having a first length 194a, a second radius 23b having a second length 194b, and a third radius 23c having a third length 194c. As shown in FIG. 2H, the third length 194c of the third radius 23c is greater than the second length 194b of the second radius 23b and is greater than the first length 194a of the first radius 23a. As shown in FIG. 2H, the second length 194b of the second radius 23b is greater that the first length 194a of the first radius 23a and is less than the third length 194c of the third radius 23c. As shown in FIG. 2H, the first length 194a of the first radius 23a is less than the second length 194b of the second radius 23b and is less than the third length 194c of the third radius 23c. Although FIG. 2H shows three radii 23 representative of the variable radius 22 of the spiral body 20, the spiral body 20 has numerous additional radii 23 of varying lengths.

As further shown in FIG. 2A, the spiral body 20 of the variable radius guide member 16 has a truncated conical spiral shape 195. In one version, as shown in FIGS. 2A-2E, 2I, 2K, the spiral body 20 has a central through opening 196 through which the spindle 14 is inserted and snugly fitted. As shown in FIGS. 2C, 2I, the first spindle end 184a and the second spindle end 184b of the spindle 14 both extend beyond the central through opening 196 of the variable radius guide member 16. In another version, as shown in FIG. 2J, the spiral body 20 does not have the central through opening 196, and the spindle 14 and the spiral body 20 are an integral part 17 integrated into a single unitary part.

As shown in FIG. 2I3, the spiral body 20 has a first continuous spiral surface 198 substantially parallel to the spindle 14. As shown in FIG. 2I, the first continuous spiral surface 198 has a constant width 200, and a groove 202 configured to receive, and receiving, the tension member 24, such as the cable 32. As further shown in FIG. 2I3, the spiral body 20 has a second continuous spiral surface 204 substantially perpendicular to the spindle 14. As shown in FIG. 2I, the second continuous spiral surface 204 has a width 206.

The values of the radii 23 (see FIG. 2H) are a function of the inclination angle 86 (see FIG. 1).

As shown in FIG. 2I, in one version, the spiral body 20 of the variable radius guide member 16, has a cross-section profile 208 with a plurality of step portions 210, including a first step portion 210a, a second step portion 210b, and a third step portion 210c. As shown in FIG. 2I, the step portions 210 ascend from the first end 18a of the variable radius guide member 16 to the second end 18b of the variable radius guide member 16.

FIGS. 2A-2J, 2L further show the tension member 24 of the variable radius assembly 10, where the tension member 24 comprises the cable 32. As shown in FIG. 2I3, the tension member 24, such as the cable 32, has a first end 212a, a second end 212b, and an elongate body 214 formed between the first end 212a and the second end 212b. The tension member 24 is attached to the variable radius guide member 16, and as shown in FIG. 2B, the first end 212a of the tension member 24, such as the cable 32, is attached to the spiral body 20 at an attach point portion 216. As shown in FIG. 2B, the attach point portion 216 is located near a first end 218 of the first continuous spiral surface 198 and near a first end 220 of the second continuous spiral surface 204. The first end 212a of the tension member 24, such as the cable 32, may be attached to the attach point portion 216 with one or more attachment elements, such as clamps, swaged connections, or another suitable attachment element. The second end 212b (see FIG. 2B) of the tension member 24, such as the cable 32, is configured to attach, and attaches, to the at least one variable length structural member 30 (see FIGS. 1, 4A).

As shown in FIGS. 2A-2E, 2H-2J, the tension member 24 wraps around, or winds around, the spiral body 20 of the variable radius guide member 16. As shown in FIG. 2H, the tension member 24, such as the cable 32, is wrapped around, or wound around, the spiral body 20 of the variable radius guide member 16, in a series of revolutions 222, including a first revolution 222a, and a second revolution 222b. As shown in FIG. 2H, the first revolution 222a has a start point 224a and an end point 224b, and the second revolution 222b has a start point 226a and an end point 226b. Alternatively, if the radii 23 of the variable radius guide member 16 and the constant radius gear 46 are large enough, a fractional revolution may be sufficient.

FIGS. 2A-2E, 2H-2J, 2L, show one version of the tension member 24 in the form of the cable 32. As shown in FIG. 2K, another version of the tension member 24 is shown in the form of the assembly 38 comprising the cable 32 coupled, or joined, to the rod 40, via the connector element 42. With the assembly 38, a portion 24a (see FIG. 2B) at a second end 212b (see FIG. 2B) of the tension member 24, such as the cable 32, is substituted, or replaced, with the rod 40 (see FIG. 2K), and the rod 40 is coupled, or joined, via the connector element 42 (see FIG. 2K), to a remaining portion 24b (see FIGS. 2B, 2K) of the tension member 24, such as the cable 32. As shown in FIG. 2K, the cable 32 is the flexible portion 39 wrapped around the spiral body 20 of the variable radius guide member 16, and the rod 40 is the straight portion 41 that is stiff and configured to brace, and braces, the variable length structural member 30 (see FIG. 1) at the inclination angle 86 (see FIG. 1) to the variable length structural member 30 throughout the range of motion 88 (see FIG. 1) of the tension member 24 and the variable length structural member 30.

As shown in FIGS. 2A-2F, 2H, 2K, the variable radius assembly 10 further comprises at least one first gear 44, such as at least one constant radius gear 46, coupled to, and driven by, the spindle 14. The first gear 44, such as the constant radius gear 46, is configured to drive, and drives, the at least one variable length structural member 30 (see FIGS. 1, 4A). As shown in FIG. 2A, the gear 43, such as the first gear 44, for example, the constant radius gear 46, has constant radius gear teeth 60 configured to mesh with intermediary gear teeth 58 (see FIG. 5A) of the intermediary gear 56 (see FIG. 5A) coupled to the torque tube 54 (see FIG. 5A). As shown in FIG. 2A, the gear 43, such as the first gear 44, for example, the constant radius gear 46, further has a first end 230a, a second end 230b, and a gear body 232 formed between the first end 230a and the second end 230b. As shown in FIG. 2A, the gear 43, such as the first gear 44, for example, the constant radius gear 46, further has a through opening 234 (see also FIG. 2F) configured to receive, and receiving, the first spindle end 184a of the spindle 14, so that a portion of the second end 230b of the constant radius gear 46 is adjacent the first end 18a of the variable radius guide member 16. Although FIG. 2A shows the first gear 44, such as the constant radius gear 46 attached near the first spindle end 184a and adjacent the first end 18a of the variable radius guide member 16, the first gear 44, such as the constant radius gear 46, may be located at another suitable position along the spindle 14. In the version of the variable radius assembly 10, as shown in FIGS. 2A-2F, 2H, 2K, the spindle 14 has the first gear 44, such as the constant radius gear 46, that both drives the at least one variable length structural member 30, and that is driven by the at least one rotational power source 52 (see FIG. 2A).

In another version, as shown in FIG. 2L, the variable radius assembly 10 further comprises the second gear 48, such as the drive gear 50, that drives the spindle 14, and the spindle 14 has both gears 43, including the first gear 44, such as the constant radius gear 46, and the second gear 48, such as the drive gear 50. In this version, the first gear 44, such as the constant radius gear 46 drives the at least one variable length structural member 30, and the second gear 48, such as the drive gear 50, is driven by the least one rotational power source 52. The drive gear 50 is powered by the rotational power source 52, which then drives the rest of the variable radius assembly 10.

As shown in FIG. 2L, the gear 43, such as the second gear 48, for example, the drive gear 50, further has a first end 236a, a second end 236b, and a gear body 238 formed between the first end 236a and the second end 236b. As shown in FIG. 2L, the gear 43, such as the second gear 48, for example, the drive gear 50, further has a through opening 240 configured to receive, and receiving, the second spindle end 184b of the spindle 14, so that a portion of the first end 236a of the drive gear 50 is adjacent the second end 18b of the variable radius guide member 16. Although FIG. 2L shows the second gear 48, such as the constant radius gear 50 attached near the second spindle end 184b and adjacent the second end 18b of the variable radius guide member 16, the second gear 48, such as the drive gear 50, may be located at another suitable position along the spindle 14. In the version of the variable radius assembly 10, as shown in FIG. 2L, the spindle 14 has the first gear 44, such as the constant radius gear 46, and has the second gear 48, such as the drive gear 50. The drive gear 50 obtains power and is driven by the least one rotational power source 52, and the spindle 14 is not rotated by the rotational power source 52 directly but through the drive gear 50.

As shown in FIGS. 2A and 2K, but also applying to FIGS. 2B-2J, the variable radius assembly 10 further comprises the at least one rotational power source 52 coupled to the spindle 14, via the first gear 44, such as the constant radius gear 46.

The rotational power source 52 is configured to rotate, and rotates, the spindle 14. In FIG. 2L, the spindle 14 is still rotated by the rotational power source 52 but through the drive gear 50 and not through the constant radius gear 46. In one version, as shown in FIGS. 1, 4A, 5A, the rotational power source 52 comprises at least one torque tube 54 with at least one intermediary gear 56 attached to the torque tube 54. The at least one intermediary gear 56 has intermediary gear teeth 58 (see FIG. 5A) configured to mesh with, and meshing with, gear teeth of the at least one gear 43, for example, constant radius gear teeth 60 (see FIG. 5A) of the at least one constant radius gear 46 (see FIG. 5A).

The rotational power source 52 may further comprise at least one spine member 62 (see FIG. 1), or one or more spine members 62, coupled to the spindle 14. The rotational power source 52 may further comprise another suitable rotational power source to provide rotational power or rotational moment to the spindle 14 known to one skilled in the art. When the structure 12 comprises a wing strut 90 used with the variable radius assembly 10 and the variable length structural members 30, the one or more torque tubes 54 coupled to the spindle 14, via the intermediary gear 56 and the constant radius gear 46, may be driven or rotated by a fuselage structure in a fuselage 242 (see FIG. 3A) of the aircraft 94a (see FIG. 3A). Further, when the structure 12 comprises a wing strut 90 used with the variable radius assembly 10 and the variable length structural members 30, the one or more spine members 62 may comprise a first spine member and a second spine member coupled to one or more reduction gear systems in the wing strut 90, or an immovable spine member connected to a spring system in an interior of the fuselage 242, or a movable spine member attached to a lever assembly in the interior of the fuselage 242.

The torque tube 54 or the spine member 62 may be coupled to a mechanical power apparatus 64 (see FIG. 1) that drives, moves, or actuates each torque tube 54 or spine member 62. The mechanical power apparatus 64 may comprise a motor 66 (see FIG. 1), a rack-and-pinion system 68 (see FIG. 1), or another suitable mechanical power apparatus. The motor 66 may comprise an electric motor powered by electricity, a battery operated motor powered by a battery, a pneumatic operated motor powered by a pneumatic system, or another suitable type of mechanical power apparatus powered by a power source. The mechanical power apparatus 64 may further comprise a hydraulic actuated mechanical power apparatus.

The spindle 14 is driven by the rotational power source 52 with a constant amount of rotation from the rotational power source 52, and the variable radius guide member 16 is taking care of the tension member length change 26a (see FIG. 1) at the non-linear rate 28 (see FIG. 1) relative to the constant radius gear 46.

In another version of the disclosure, there is provided a vehicle 94 (see FIGS. 1, 3A-3B), such as an aircraft 94a (see FIGS. 1, 3A-3B) having a wing strut 90 (see FIGS. 1, 3A-3B) with one or more variable radius assemblies 10 (see FIGS. 1, 3A-3B). The aircraft 94a comprises a fuselage 242 (see FIGS. 3A-3B), and two wings 92 (see FIGS. 1, 3A-3B) coupled to the fuselage 242, and the wings 92 extending from the fuselage 242 opposite each other. The aircraft 94a further comprises the wing strut 90 (see FIGS. 1, 3A-3B) attached to each of the two wings 92. The wing strut 90 has the strut cross section 102 (see FIGS. 1, 4A, 4C) with the airfoil shape 104 (see FIGS. 1, 4A, 4C).

The aircraft 94a further comprises the one or more variable radius assemblies 10 (see FIGS. 1, 3A-3B) coupled to an interior 98 (see FIGS. 3A-3B) of each wing strut 90. As discussed above, each variable radius assembly 10 comprises the spindle 14 (see FIGS. 1, 2A), and at least one variable radius guide member 16 (see FIGS. 1, 2A) coupled to, and driven by, the spindle 14. The at least one variable radius guide member 16 has a spiral body 20 (see FIGS. 1, 2A) with a variable radius 22 (see FIGS. 1, 2G). The spiral body 20 preferably has a truncated conical spiral shape 195 (see FIG. 2A), and in one version, has the central through opening 196 (see FIG. 2A) through which the spindle 14 is inserted and snugly fitted. The spiral body 20 may further comprise the first continuous spiral surface 198 (see FIGS. 2B, 2I) substantially parallel to the spindle 14 and having a constant width 200 (see FIG. 2I). The first continuous spiral surface 198 further has a groove 202 (see FIG. 2I) configured to receive the tension member 24. The spiral body 20 may further comprise the second continuous spiral surface 204 (see FIGS. 2B, 2I) substantially perpendicular to the spindle 14 and having the width 206 (see FIG. 2I).

Each variable radius assembly 10 further comprises the tension member 24 (see FIGS. 1, 2A) attached to the at least one variable radius guide member 16 The tension member 24 is configured to wrap around, or wind around, the spiral body 20. The tension member 24 may comprise one of, the cable 32 (see FIGS. 1, 2A), a cord 34 (see FIG. 1), a wire 36 (see FIG. 1), or the assembly 38 (see FIGS. 1, 2J) comprising the rod 40 (see FIGS. 1, 2K) coupled, via the connector element 42 (see FIGS. 1, 2K), to one of, the cable 32 (see FIG. 2K), the cord 34, or the wire 36.

Each variable radius assembly 10 further comprises the at least one constant radius gear 46 (see FIGS. 1, 2A) coupled to, and driven by, the spindle 14. Each variable radius assembly 10 further comprises at least one rotational power source 52 (see FIGS. 1, 2A) coupled to the spindle 14, and configured to rotate the spindle 14. In one version, the at least one rotational power source 52 comprises a torque tube 54 (see FIGS. 1, 4A, 5A) with at least one intermediary gear 56 (see FIGS. 1, 4A, 5A) attached to the torque tube 54. As shown in FIG. 5A, the at least one intermediary gear 56 has intermediary gear teeth 58 configured to mesh with constant radius gear teeth 60 of the at least one constant radius gear 46.

The aircraft 94a further comprises one or more variable length structural members 30 (see FIGS. 1, 4A, 4C) attached to the tension member 24 of each of the one or more variable radius assemblies 10, and driven by the at least one constant radius gear 46. The one or more variable length structural members 30 are configured to transition the wing strut 90 (see FIGS. 4A, 4C) between a contracted position 110 (see FIG. 4C) and an extended position 112 (see FIG. 4A), and configured to transition the strut cross section 102 (see FIGS. 4A, 4C) between a contracted airfoil shape 106 (see FIG. 4C) and an extended airfoil shape 108 (see FIG. 4A). The one or more variable length structural members 30 may comprise one of, one or more compression chains 70 (see FIGS. 1, 4B), one or more cam elements 72 (see FIG. 1), one or more springs 74 (see FIG. 1), one or more telescoping structural compression members 78 (see FIG. 1), or another suitable variable length structural member 30.

The at least one variable radius guide member 16 of each of the one or more variable radius assemblies 10 enables a tension member length change 26a (see FIG. 1) of the tension member 24 at a non-linear rate 28 (see FIG. 1) for a constant rate of rotation 84 (see FIG. 1) of the spindle 14, allowing the one or more variable length structural members 30 to be braced by the tension member 24 at an inclination angle 86 (see FIG. 1) to the one or more variable length structural members 30 throughout a range of motion 88 (see FIG. 1).

Now referring to FIGS. 3A-3B, FIGS. 3A-3B show structures 12, such as wing struts 90 for wings 92 of a vehicle 94, such as an aircraft 94a, that the variable radius assemblies 10, discussed above, can be coupled to, and used with. FIG. 3A is an illustration of a front perspective view of an exemplary vehicle 94, such as an aircraft 94a, having wing struts 90 with exemplary variable radius assemblies 10 of the disclosure. FIG. 3B is an illustration of a front perspective view of the vehicle 94, such as the aircraft 94a of FIG. 3A, with wing struts 90 and variable radius assemblies 10, and further including jury struts 96 positioned between the wings 92 and the wing struts 90.

The variable radius assemblies 10 coupled to the wing strut 90 may be used with any aircraft, such as aircraft 94a (see FIGS. 3A-3B), having strut-braced wings, including small jet aircraft, large jet aircraft, commercial aircraft, military aircraft, cargo aircraft, and other types of aircraft. The variable radius assemblies 10 coupled to the wing strut 90 is particularly suitable for large jet aircraft with high Mach numbers in a subsonic range, since low aerodynamic drag in the subsonic range is desirable.

As shown in FIGS. 3A-3B, the vehicle 94, such as the aircraft 94a, comprises wings 92, a fuselage 242, a nose 244, engines 246, and a tail 248. Each wing 92 comprises a strut-braced wing and is in the form of a fixed wing. The fuselage 242, also referred to as the body, includes fuselage structures in the interior of the fuselage 242. The fuselage structures may include one or more of, the mechanical power apparatus 64 (see FIG. 1), such as the motor 66 (see FIG. 1), the rack-and-pinion system 68 (see FIG. 1), or other suitable fuselage structures within the interior of the fuselage 242, or coupled to the fuselage 242.

As shown in FIGS. 3A-3B, each wing strut 90 has an interior 98 and an exterior 100. As shown in FIGS. 3A-3B, each wing strut 90 has a strut structure 250. The strut structure 250 has an outboard end 252 (see FIGS. 3A-3B), an inboard end 254 (see FIGS. 3A-3B) opposite the outboard end 252, and an elongate body 256 (see FIGS. 3A-3B) formed between the inboard end 254 and the outboard end 252. The outboard end 252 of the strut structure 250 is coupled, or attached, to the wing 92 of the vehicle 94, such as the aircraft 94a (see FIGS. 3A-3B). The inboard end 254 of the strut structure 250 is coupled, or attached, to the fuselage 242. The strut structure 250 may further comprise structures such as strut spars, ribs, strut fittings, or other suitable structures or parts, in the interior 98 of the wing strut 90.

FIG. 3A further shows the strut root 152 of each wing strut 90. As shown in FIGS. 3A-3B, each wing strut 90 has a leading edge 258 and a trailing edge 260. The wing strut 90 may comprise one or more of, a composite material, including a carbon composite material, or a metal material, including an aluminum material, a steel material, a titanium material, a combination of the composite material and the metal material, or another suitable material.

As shown in FIGS. 3A-3B, the variable radius assemblies 10 coupled to the wing strut 90 are further coupled to at least one shape transition assembly 130, or to one or more shape transition assemblies 130, connected to the interior 98 of the wing strut 90. Each shape transition assembly 130 is configured to transition the wing strut 90 between the contracted position 110 (see FIG. 4C) and the extended position 112 (see FIG. 4A), and is configured to transition a strut cross section 102 (see FIGS. 4A, 4C) between a contracted airfoil shape 106 (see FIG. 4C) and an extended airfoil shape 108 (see FIG. 4A).

Now referring to FIGS. 4A-4E, FIGS. 4A-4E show a structure 12 such as a wing strut 90, with exemplary variable radius assemblies 10 and variable length structural members 30, such as compression chains 70. FIG. 4A is an illustration of a left outboard side view of a schematic diagram of the structure 12 comprising the wing strut 90 with exemplary variable radius assemblies 10 of the disclosure, and variable length structural members 30, such as compression chains 70. FIG. 4A shows the wing strut 90 in a minus 1 g pushover flight condition 124, and in an extended position 112, such as a fully extended position 112a, and shows the strut cross section 102 with the airfoil shape 104 in an extended airfoil shape 108, such as a fully extended airfoil shape 108a.

FIG. 4A shows four (4) variable radius assemblies 10, where each variable radius assembly 10 comprises a spindle 14 and a constant radius gear 46 coupled to the spindle 14. As shown in FIG. 4A, each constant radius gear 46 has constant radius gear teeth 60 coupled to, and meshing with, intermediary gear teeth 58 of the intermediary gear 56. Each intermediary gear 56 is coupled to a torque tube 54 (see FIG. 4A). FIG. 4A shows two torque tubes 54 and two intermediary gears 56, and the two torque tubes 54 are coupled to a center fitting 262. The two torque tubes 54 and the intermediary gears 56 comprise the rotational power source 52 (see FIG. 4A) of the variable radius assemblies 10 and further comprise an actuation mechanism 140 (see FIG. 4A). The two torque tubes 54 comprise a forward torque tube 54a (see FIG. 4C) and an aft torque tube 54b (see FIG. 4C).

Each variable radius assembly 10 further comprises a tension member 24 (see FIG. 4A), such as a cable 32 (see FIG. 4A), attached to a variable radius guide member 16 (see FIGS. 1, 2A), and attached to the variable length structural member 30, such as the compression chain 70. The tension members 24, such as the cables 32 run diagonally and carry chord-wise shear in the wing strut 90. One or more of the cables 32 may be situated to form a cross-bracing arrangement 76 (see FIG. 4A).

FIG. 4A further shows a length change comparison 264 corresponding to a compression chain 70, such as a compression chain 70a, and corresponding to a tension member 24, such as a tension member 24c, of the wing strut 90. As shown in FIG. 4A, the length change comparison 264 shows a compression chain length change ($\Delta L_1$) 266a of a compression chain length 266 between an extended compression chain length 266b and a contracted compression chain length 266c. As further shown in FIG. 4A, the length change comparison 264 shows a tension member length change ($\Delta L_2$) 26a of a tension member length 26 between an extended tension member length 26b and a contracted tension member length 26c.

Although typically the compression chain length change ($\Delta L_1$) 266a is not equal to the tension member length change ($\Delta L_2$) 26a, and the rate of extension of the tension member 24, such as the cable 32, is not at the same rate of extension as the compression chain 70, the variable radius assemblies 10 enable a desired non-linear variation of tension member lengths 26, such as cable lengths, and the variable radius assemblies 10 accommodate non-linear variation in the tension member lengths 26, such as the cable lengths.

FIG. 4A further shows a shape transition mechanism 132 comprising a plurality of fixed length structural members 136 forming an expandable structure 134 having a hexagon shape 268, and further comprising a drive mechanism 138 comprising the plurality of variable length structural members 30 in the form of the compression chains 70. FIG. 4A further shows the strut structure 250 with a leading edge 270 and a trailing edge 272 having an aft membrane 274 with an aft membrane spring 275. FIG. 4A further shows a centerline 276 through the wing strut 90 in the chord-wise direction, and the height 114 of the wing strut 90.

FIG. 4B is an illustration of a front view of a schematic diagram of a portion 90a of the wing strut 90 of FIG. 4A, showing variable length structural members 30, such as the compression chains 70, where the wing strut 90 is in the extended position 112, such as the fully extended position 112a. FIG. 4B shows the compression chains 70, for example, a first set 70a of compression chains 70 and a second set 70b of compression chains 70, each coupled to the center fitting 262. FIG. 4B further shows the torque tube 54.

FIG. 4C is an illustration of a left outboard side view of a schematic diagram of the structure 12 comprising the wing strut 90 with the variable radius assemblies 10 of FIG. 4A, and the variable length structural members 30, such as the compression chains 70. FIG. 4C shows the wing strut 90 in a cruise flight condition 120, and in a contracted position 110, such as a fully contracted position 110a, and shows the strut cross section 102 with the airfoil shape 104 in a contracted airfoil shape 106, such as a fully contracted airfoil shape 106a.

FIG. 4C shows the four (4) variable radius assemblies 10, where each variable radius assembly 10 comprises the spindle 14 and the constant radius gear 46 coupled to the spindle 14. As shown in FIG. 4C, each constant radius gear 46 has constant radius gear teeth 60 coupled to, and meshing with, intermediary gear teeth 58 of the intermediary gear 56. Each intermediary gear 56 is coupled to the torque tube 54 (see FIG. 4C). FIG. 4C shows the two torque tubes 54 coupled to the center fitting 262, in the form of the forward torque tube 54a and the aft torque tube 54b.

Each variable radius assembly 10 further comprises the tension member 24 (see FIG. 4C), such as the cable 32 (see FIG. 4C), attached to the variable radius guide member 16 (see FIGS. 1, 2A), and attached to the variable length structural member 30, such as the compression chain 70. FIG. 4C further shows the length change comparison 264 corresponding to the compression chain 70, such as the compression chain 70a, and corresponding to the tension member 24, such as the tension member 24c, of the wing strut 90. As shown in FIG. 4C, the length change comparison 264 shows the compression chain length change ($\Delta L_1$) 266a of the compression chain length 266 between the extended compression chain length 266b and the contracted compression chain length 266c. As further shown in FIG. 4C, the length change comparison 264 shows the tension member length change ($\Delta L_2$) 26a of the tension member length 26 between the extended tension member length 26b and the contracted tension member length 26c. Although typically the compression chain length change ($\Delta L_1$) 266a is not equal to the tension member length change ($\Delta L_2$) 26a, and the rate of extension of the tension member 24, such as the cable 32, is not at the same rate of extension as the compression chain 70, the variable radius assemblies 10 enable a desired non-linear variation of tension member lengths 26, such as cable lengths, and the variable radius assemblies 10 accommodate non-linear variation in the tension member lengths 26, such as the cable lengths.

FIG. 4C further shows the shape transition mechanism 132 comprising the plurality of fixed length structural members 136 forming an expandable structure 134 having the hexagon shape 268, and further comprising the drive mechanism 138 comprising the plurality of variable length structural members 30 in the form of the compression chains 70. FIG. 4C further shows the strut structure 250 with the leading edge 270 and the trailing edge 272 having the aft membrane spring 275. FIG. 4C further shows the centerline 276 through the wing strut 90 in the chord-wise direction, and the height 114 of the wing strut 90. The height 114, or thickness, of the wing strut 90 in the fully contracted position 110*a*, as shown in FIG. 4C, is less than the height 114, or thickness, of the wing strut 90 in the fully extended position 112*a*, as shown in FIG. 4A.

FIG. 4D is an illustration of a front view of a schematic diagram of a portion 90*b* of the wing strut 90 of FIG. 4C, showing the variable length structural members 30, such as the compression chains 70, where the wing strut 90 is in the contracted position 110, such as the fully contracted position 110*a*. FIG. 4D shows the compression chains 70, for example, the first set 70*a* of compression chains 70 and the second set 70*b* of compression chains 70, each coupled to the center fitting 262. FIG. 4D further shows the torque tube 54.

FIG. 4E is an illustration of a left outboard side view of a schematic diagram of the structure 12 comprising the wing strut 90 with exemplary variable radius assemblies 10 of FIG. 4A, and the variable length structural members 30, such as the compression chains 70. FIG. 4E shows the wing strut 90 in an intermediate flight condition 122, and in an intermediate extended position 113, and shows the strut cross section 102 with the airfoil shape 104 in an intermediate extended 109.

FIG. 4E shows the four (4) variable radius assemblies 10, each with the spindle 14 and the constant radius gear 46 coupled to the spindle 14. As shown in FIG. 4E, each constant radius gear 46 has constant radius gear teeth 60 coupled to, and meshing with, intermediary gear teeth 58 of the intermediary gear 56. Each intermediary gear 56 is coupled to the torque tube 54 (see FIG. 4E). FIG. 4E shows the two torque tubes 54 coupled to the center fitting 262.

FIG. 4E further shows each variable radius assembly 10 comprising the tension member 24, such as the cable 32, attached to the variable radius guide member 16 (see FIGS. 1, 2A), and attached to the variable length structural member 30, such as the compression chain 70. FIG. 4E further shows the shape transition mechanism 132 comprising the plurality of fixed length structural members 136 forming an expandable structure 134 having the hexagon shape 268, and further comprising the drive mechanism 138 comprising the plurality of variable length structural members 30 in the form of the compression chains 70. FIG. 4E further shows the strut structure 250 with the leading edge 270 and the trailing edge 272 having the aft membrane 274 and the aft membrane spring 275. FIG. 4E further shows height 114 of the wing strut 90. The height 114, or thickness, of the wing strut 90 in the intermediate extended position 113, as shown in FIG. 4E, is greater than the height 114, or thickness, of the fully contracted position 110*a*, as shown in FIG. 4C, and is less than the height 114, or thickness, of the wing strut 90 in the fully extended position 112*a*, as shown in FIG. 4A.

Now referring to FIGS. 5A-5B, FIG. 5A is an illustration of a graph 278 of height 280 versus width 282 of a geometric arrangement 284 comprising the variable radius assembly 10 with the tension member 24, the variable length structural member 30, such as the compression chain 70, a link 286 to the compression chain 70, and the rotational power source 52. FIG. 5A is representative of an intermediate position between a retraction and an extension of the compression chain 70 and the tension member 24. FIG. 5B is an illustration of an enlarged view 278*a* of box 5B of FIG. 5A, showing the position of the tension member 24 around the variable radius guide member 16 for the height 280 of the end of the variable length structural member 30, such as the compression chain 70.

Both the graph 278 of FIG. 5A and the enlarged view 278*a* of FIG. 5B show the height 280 on the y-axis and the width 282 on the x-axis. The height 280 and the width 282 are measured in inches. However, the height 280 and the width 282 may also be measured in feet, centimeters, meters, or another suitable length measurement.

FIG. 5A shows the variable radius assembly 10 comprising the spindle 14, the variable radius guide member 16 coupled to the spindle 14, the tension member 24, such as the cable 32, attached to the variable radius guide member 16, the constant radius gear 46 coupled to the spindle 14, and the rotational power source 52 coupled to the constant radius gear 46. As further shown in FIG. 5A, the tension member 24, such as the cable 32, has the first end 212*a* attached to the variable radius guide member 16 and has the second end 212*b* attached to the variable length structural member 30, such as the compression chain 70.

As further shown in FIG. 5A, the rotational power source 52 comprises the torque tube 54 coupled to the intermediary gear 56, and the intermediary gear 56 has intermediary gear teeth 58 that mesh with, or couple with, the constant radius gear teeth 60 of the constant radius gear 46. The rotational power source 52, such as the torque tube 54 coupled to the intermediary gear 56, drive the constant radius gear 46 of the variable radius assembly 10. As further shown in FIG. 5A, in one version, the rotation of the constant radius gear 46 by the rotational power source 52 drives, or rotates, the spindle 14 and the variable radius guide member 16, to cause the tension member 24, such as the cable 32, to unwrap or unwind from the variable radius guide member 16 and extend in length, when the compression chain 70 extends, or to wrap and wind around the variable radius guide member 16 and retract in length, when the compression chain 70 retracts. As further shown in FIG. 5A, in one version, the rotation of the constant radius gear 46 by the rotational power source 52 also drives a link 286 to the compression chain 70, to, in turn, drive and extend or retract the compression chain 70. As shown in FIG. 5A, the link 286 comprises a rack 288 coupled to the compression chain 70. The rack 288 has an intermeshable surface 290 (see FIG. 5A), such as rack teeth, or another intermeshable surface, meshing with, or coupling with, the constant radius gear teeth 60 of the constant radius gear 46. In another version, the link 286 may comprise another suitable structure coupled between the constant radius gear 46 and the compression chain 70.

In another version, the variable radius assembly 10 of the geometric arrangement 284 (see FIG. 5A) may also include the second gear 48, such as the drive gear 50, of FIG. 2L, coupled to the spindle 14. In this version, the rotational power source 52 drives the second gear 48, to drive, or rotate, the spindle 14 and the variable radius guide member 16, to cause the tension member 24, such as the cable 32, to unwrap or unwind from the variable radius guide member 16 and extend in length, when the compression chain 70 extends, or to wrap and wind around the variable radius guide member 16 and retract in length, when the compression chain 70 retracts, and the constant radius gear 46 drives the link 286 to the compression chain 70.

FIG. 5A further shows the compression chain 70 comprising a first portion 292, such as a vertical portion 292*a*, having a vertical length 294. The height 280 on the y-axis shows the height 280 of the vertical portion 292*a* of the compression chain 70. FIG. 5A further shows a second portion 295, such as a horizontal portion 295*a*, having a horizontal length 296. The width 282 on the x-axis shows the width 282 of the horizontal portion 298*a*, or the distance between where the compression chain 70 transitions between the horizontal portion 295*a* and the vertical portion 292*a* and the center of the spindle 14. Any horizontal movement of the horizontal portion 295*a* of the compression chain 70 is equal to vertical movement of the vertical portion 292*a* of the compression chain 70. The length that enters into the calculation of how the radii 23 of the variable radius guide member 16 changes is the length between the second end 212*b* of the tension member 24, such as the cable 32, and the point of tangency.

The compression chain 70 curves around a curved guide assembly (not shown) to move or transition between the horizontal portion 294*a* with the horizontal length 296, and the vertical portion 292*a* with the vertical length 294. FIG. 5A shows the height 280 of the vertical portion 292*a* of the compression chain 70 is 6.0 inches, and shows the width 282 of the horizontal portion 294*a* is approximately 4.8 inches. The compression chain 70 shown in FIG. 5A is not fully extended and is not fully retracted. As shown in FIG. 5A, the compression chain 70 has portions 298 spaced approximately 1 (one) inch apart corresponding to the 1-inch intervals along the height 280 y-axis. FIGS. 5A-5B further shows a rotation 300 of the constant radius gear 46 of 229 degrees. As shown in FIG. 5A, the tension member 24 has the tension member length 26 that varies at a different length than the vertical length 294 of the compression chain 70.

FIG. 5B shows a center 302 of the constant radius gear 46, the spindle 14, and the variable radius guide member 16, and shows a radius 23 of the variable radius guide member 16 at the point of tangency, such as discrete point 305, from the center 302 to the tension member 24. As shown in FIG. 5B, the radius 23 is equal to 0.27 inch at the 229 degree rotation 300. FIG. 5B further shows a gear edge 303 in contact with the link 286, such as the rack 288, of the compression chain 70. FIG. 5B further shows increments 304 of extension or retraction of the compression chain 70 (see FIG. 5A), corresponding to discrete points 305 along the tension member 24. In one version, as shown in FIG. 5B, each increment 304 (0.25 inch) of extension or retraction of the compression chain 70, represents an extension or retraction between increments 304, less than 0.25 inch. The number is to a first order equal to 0.25 inch multiplied by the sine of the inclination angle 86 (see FIG. 1), such as inclination angle alpha ($\alpha$) 86*a* (see FIG. 7), at each increment 304 of movement.

Figure 6:
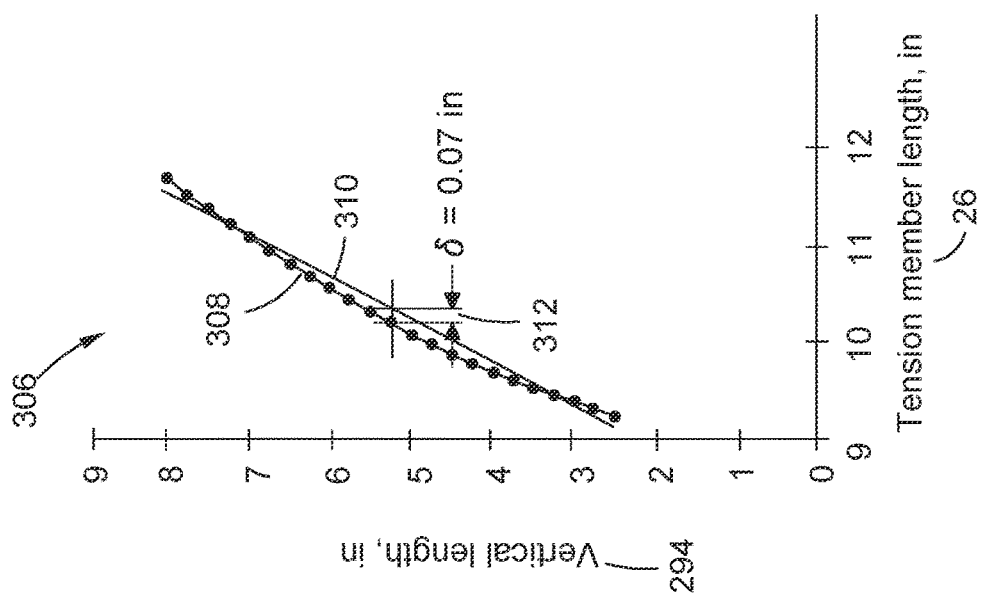
FIG. 6 is an illustration of a variation of lengths graph of vertical lengths versus tension member lengths.

Now referring to FIG. 6, FIG. 6 is an illustration of a variation of lengths graph 306 of vertical lengths 294 of the compression chain 70 of FIG. 5A versus tension member lengths 26 of the tension member 24 of FIG. 5A. The variation in length is a non-linear variation, and the non-linear variation of tension member lengths 26 of the tension member 24 of FIG. 5A correspond to the vertical lengths 294 of the compression chain 70 of FIG. 5A, where the vertical lengths 294 are every ¼ inch (0.25 inch). FIG. 6 shows the vertical length 294, in inches, on the y-axis, and shows the tension member length 26, in inches, on the x-axis. However, the vertical length 294 and the tension member length 26 may also be measured in feet, centimeters, meters, or another suitable length measurement. FIG. 6 shows a plot line 308 representing the tension member lengths 26 of the tension member 24 of FIG. 5A using the variable radius assembly 10 disclosed herein. FIG. 6 further shows a plot line 310 representing lengths of a tension member such as a cable using a linear gear where the variation in length is linear and where the variable radius assembly 10 disclosed herein is not used. FIG. 6 further shows a mismatch length delta deflection ($\delta$) 312 equal to 0.07 inch, which would be a mismatch difference sufficient to break the tension member or cable or cause issues with the tension member or cable. Thus, if linearization is attempted, the induced stresses in the tension member, such as the cable would be large. The use of the variable radius assembly 10 avoids and prevents overstressing or even breaking the tension member 24, such as the cable 32, or other issues with the tension member 24, such as the cable 32.

Figure 7:
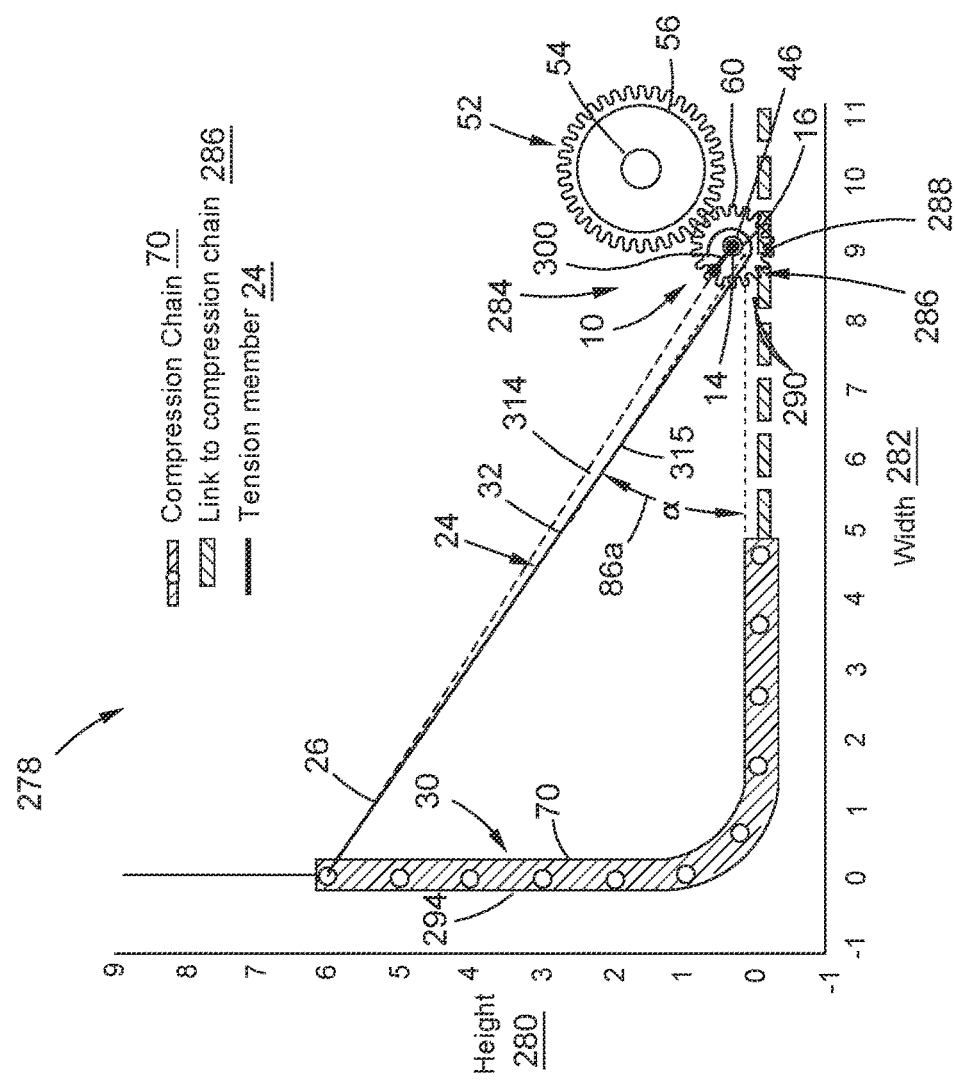
FIG. 7 is an illustration of the graph of height versus width of the geometric arrangement of FIG. 5A, showing an inclination angle alpha.

Now referring to FIG. 7, FIG. 7 is an illustration of the graph 278 of height 280 versus width 282 of the geometric arrangement 284 of FIG. 5A, showing an inclination angle alpha ($\alpha$) 86*a* formed between the tension member 24, such as the cable 32, and the variable length structural member 30, such as the compression chain 70. FIG. 7 shows the geometry causing the non-linear behavior. The tension member 24, such as the cable 32, comes off the variable radius guide member 16 tangent to the variable radius guide member 16. FIG. 7 further shows the rotation 300 and further shows a first position 314 of the tension member 24 and a second position 315 of the tension member 24. The spindle 14 is at a constant location, and as the compression chain 70 extends or retracts, the tension member length 26 varies to a first order approximation as a sine of the inclination angle alpha ($\alpha$) 86*a*. The change in tension member length 26 to a first order approximation is equal to the change in the vertical length 294 of the compression chain 70 multiplied by the sine of the inclination angle alpha ($\alpha$) 86*a*. Thus, the tension member length 26 changes slowly when the inclination angle alpha ($\alpha$) 86*a* is small, and increases when the inclination angle alpha ($\alpha$) 86*a* becomes larger.

The reason that the tension member length 26 varies to a first order approximation as a sine of the inclination angle alpha ($\alpha$) 86*a* is that as the inclination angle 86, such as the inclination angle alpha ($\alpha$) 86*a*, changes, the location of the point of tangency also changes, and so the tension member length 26 of the tension member 24, such as the cable 32, and the value of the inclination angle alpha ($\alpha$) 86*a* varies very slightly as the variable length structural member 30, such as the compression chain 70, moves upward or downward. This difference is small and would likely have a small effect on the function of the variable radius assembly 10. However, when designing hardware, one would want to include this effect, since it is feasible to do by one skilled in the art.

FIG. 7 shows the variable radius assembly 10 comprising the spindle 14, the variable radius guide member 16 coupled to the spindle 14, the tension member 24, such as the cable 32, attached to the variable radius guide member 16, the constant radius gear 46 coupled to the spindle 14, and the rotational power source 52 coupled to the constant radius gear 46. FIG. 7 further shows the rotational power source 52 comprising the torque tube 54 coupled to the intermediary gear 56 having intermediary gear teeth 58 that mesh with, or couple with, the constant radius gear teeth 60 of the constant radius gear 46. FIG. 7 further shows the link comprising the rack 288 with the intermeshable surface 290.

Figures 8A, 8B:
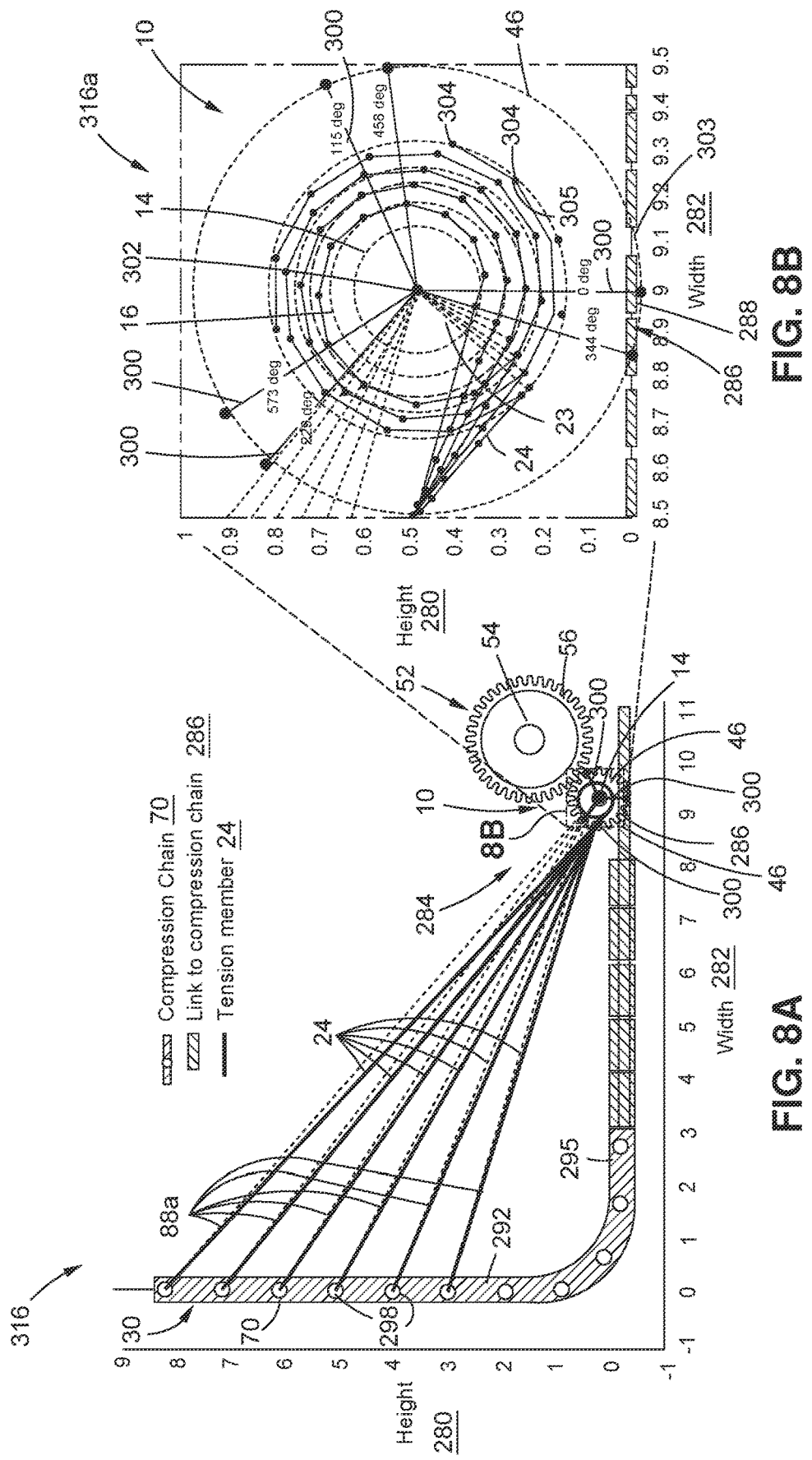
FIG. 8A is an illustration of a graph of height versus width of a geometric arrangement, showing various stages of a range of motion.
FIG. 8B is an illustration of an enlarged view of box 8B of FIG. 8A.

Now referring to FIGS. 8A-8B, FIG. 8A is an illustration of a graph 316 of height 280 versus width 282 of the geometric arrangement 284 comprising the variable radius assembly 10 with the tension member 24, the variable length structural member 30 comprising the compression chain 70, the link 286 to the compression chain 70, and the rotational power source 52, showing various range of motion stages 88a of the tension member 24 and the compression chain 70. FIG. 8B is an illustration of an enlarged view 316a of box 8B of FIG. 8A, showing the positions of the tension member 24 around the variable radius guide member 16 for various heights 280 of the end of the variable length structural member 30, such as the compression chain 70. The geometric arrangement 284 of FIG. 8A is as described with respect to FIG. 5A, and the compression chain 70 first portion 292 and second portion 295 of FIG. 8A are as described with respect to FIG. 5A.

Both the graph 316 of FIG. 8A and the enlarged view 316a of box 8B FIG. 8B show the height 280 on the y-axis and the width 282 on the x-axis. The height 280 and the width 282 are measured in inches. However, the height 280 and the width 282 may also be measured in feet, centimeters, meters, or another suitable length measurement. The range of motion stages 88a of the tension member 24 and the compression chain 70 are shown at the portions 298 of the compression chain 70 spaced approximately 1 (one) inch apart corresponding to the 1-inch intervals along the height 280 y-axis. FIGS. 8A-8B show multiple rotations 300 of the constant radius gear 46.

FIG. 8B shows a center 302 of the constant radius gear 46, the spindle 14, and the variable radius guide member 16, and shows multiple radii 23 of the variable radius guide member 16 at the points of tangency, such as discrete points 305, from the center 302 to the tension member 24. FIG. 8B further shows various rotations 300 of the constant radius gear 46, such as 229 degrees, 573 degrees, 115 degrees, 458 degrees, 0 degree, and 344 degrees. FIG. 8B further shows the gear edge 303 in contact with the link 286, such as the rack 288, of the compression chain 70 (see FIG. 8A). FIG. 8B further shows increments 304 of extension or retraction of the compression chain 70 (see FIG. 8A), corresponding to discrete points 305 along the tension member 24. Each increment 304 (0.25 inch) of extension or retraction of the compression chain 70, represents an increment of extension or retraction between increments 304 of the tension member 24 that are less than 0.25 inch at various amounts of extension.

Figures 9E, 9F:
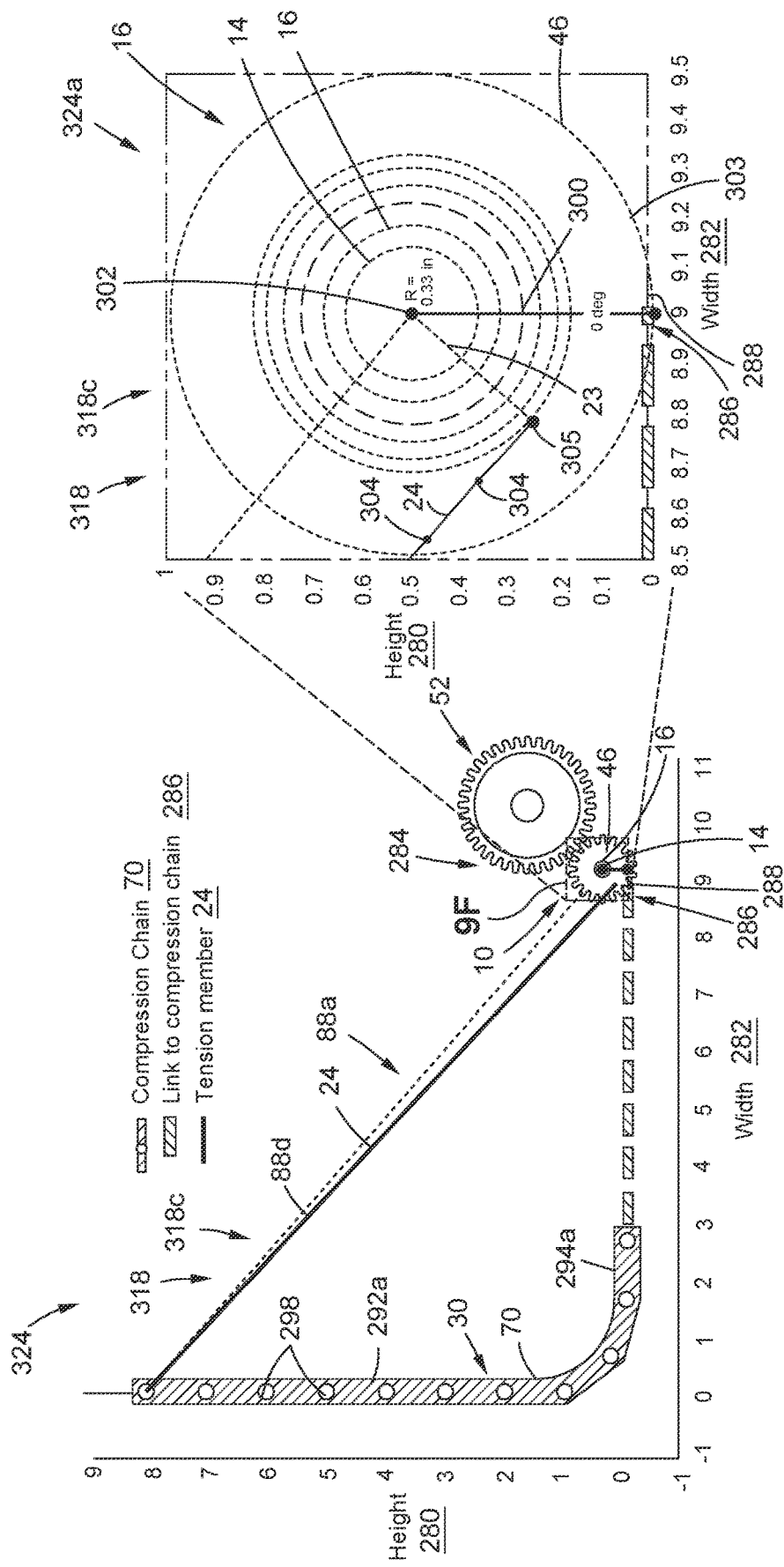
FIG. 9E is an illustration of a graph of height versus width of the geometric arrangement of FIG. 9A, showing a final position of the wing strut extending sequence.
FIG. 9F is an illustration of an enlarged view of box 9F of FIG. 9E.

Now referring to FIGS. 9A-9F, FIGS. 9A-9F show a wing strut extending sequence 318 of the geometric arrangement 284 showing a fully contracted position various range of motion stages 88a of the tension member 24 and the compression chain 70. FIGS. 9A, 9C, and 9E all show the geometric arrangement 284 of the variable radius assembly 10 with the tension member 24, the variable length structural member 30, such as the compression chain 70, and the rotational power source 52 for extending the compression chain 70 and the tension member 24. FIGS. 9A-9F all show the variable radius assembly 10 with the spindle 14, the variable radius guide member 16, the tension member 24, the constant radius gear 46, and the rotational power source 52. FIGS. 9A-9F all further show the link 286 comprising the rack 288 coupled to the compression chain 70. FIGS. 9B, 9D, and 9F all further show the center 302 of the constant radius gear 46, the spindle 14, and the variable radius guide member 16, the gear edge 303 in contact with the link 286, such as the rack 288, and the increments 304 (0.25 inch) of extension of the compression chain 70 corresponding to discrete points 305 along the tension member 24, where each increment 304 of extension represents extension increments 304 of the tension member 24.

FIG. 9A is an illustration of a graph 320 of height 280 versus width 282 of the geometric arrangement 284 comprising the variable radius assembly 10 with the tension member 24, the variable length structural member 30, such as the compression chain 70, the link 286, such as the rack 288, to the compression chain 70, and the rotational power source 52. FIG. 9B is an illustration of an enlarged view 320a of box 9B of FIG. 9A, showing the position of the tension member 24 around the variable radius guide member 16 for the height 280 of the end of the variable length structural member 30, such as the compression chain 70. FIGS. 9A-9B show an initial position 318a of the wing strut extending sequence 318. FIG. 9A shows a fully retracted range of motion stage 88b of the tension member 24 and the compression chain 70.

As shown in FIG. 9A, the height 280 of the vertical portion 292a of the compression chain 70 is 2.5 inches, and the width 282 of the horizontal portion 294a is approximately 8.0 inches. As shown in FIG. 9A, the compression chain 70 has portions 298 spaced approximately 1 (one) inch apart corresponding to the 1-inch intervals along the height 280 y-axis. FIG. 9B further shows the radius 23 equal to 0.11 inch and the rotation 300 equal to 630 degrees. Since the constant radius gear 46 is at a 0.4 elevation, y=h−0.4=2.5−0.4=2.1; and x=horizontal distance=9.0; and theta=α tan (2.1/9.0)=13.1 degrees; and sin(13.1)=0.227; and 0.227× 0.5=0.113, which is about a first order approximation. FIG. 9B further shows the increments 304 of extension of the compression chain 70 (see FIG. 9A), corresponding to discrete points 305 along the tension member 24.

FIG. 9C is an illustration of a graph 322 of height 280 versus width 282 of the geometric arrangement 284 of FIG. 9A, showing an intermediate position 318b of the wing strut extending sequence 318. As shown in FIG. 9C, the geometric arrangement 284 comprises the variable radius assembly 10 with the tension member 24, the variable length structural member 30, such as the compression chain 70, the link 286, such as the rack 288, to the compression chain 70, and the rotational power source 52. FIG. 9D is an illustration of an enlarged view 322a of box 9D of FIG. 9C, showing the position of the tension member 24 around the variable radius guide member 16 for the height 280 of the end of the variable length structural member 30, such as the compression chain 70. FIGS. 9C-9D show the intermediate position 318b of the wing strut extending sequence 318. FIG. 9C shows an intermediate range of motion stage 88c of the tension member 24 and the compression chain 70.

As shown in FIG. 9C, the height 280 of the vertical portion 292a of the compression chain 70 is 5.0 inches, and the width 282 of the horizontal portion 294a is approximately 6.0 inches. The change in height 280 or Δh, compared to that in FIG. 9A, is 2.5 inches. As shown in FIG. 9C, the compression chain 70 has portions 298 spaced approximately 1 (one) inch apart corresponding to the 1-inch intervals along the height 280 y-axis. FIG. 9D further shows the radius 23 equal to 0.23 inch and the rotation 300 equal to 344 degrees. Since the constant radius gear 46 is at a 0.3 elevation, y=h−0.3=5.0−0.3=4.7; and x=horizontal distance=8.8; and theta=α tan (4.7/8.8)=28.1 degrees; and sin(28.1)=0.471; and 0.471×0.5=0.235, which is about a first order approximation. FIG. 9D further shows the increments 304 of extension of the compression chain 70 (see FIG. 9C), corresponding to discrete points 305 along the tension member 24.

FIG. 9E is an illustration of a graph 324 of height 280 versus width 282 of the geometric arrangement 284 of FIG. 9A, showing a final position 318c of the wing strut extending sequence 318. As shown in FIG. 9E, the geometric arrangement 284 comprises the variable radius assembly 10 with the tension member 24, the variable length structural member 30, such as the compression chain 70, the link 286, such as the rack 288, to the compression chain 70, and the rotational power source 52. FIG. 9F is an illustration of an enlarged view 324a of box 9F of FIG. 9E, showing the position of the tension member 24 around the variable radius guide member 16 for the height 280 of the end of the variable length structural member 30, such as the compression chain 70. FIGS. 9E-9F show the final position 318c of the wing strut extending sequence 318. FIG. 9E shows a fully extended range of motion stage 88d of the tension member 24 and the compression chain 70.

As shown in FIG. 9E, the height 280 of the vertical portion 292a of the compression chain 70 is 8.0 inches, and the width 282 of the horizontal portion 294a is approximately 3.0 inches. The change in height 280 or Δh, compared to that in FIG. 9C, is 3.0 inches. As shown in FIG. 9E, the compression chain 70 has portions 298 spaced approximately 1 (one) inch apart corresponding to the 1-inch intervals along the height 280 y-axis. FIG. 9F further shows the radius 23 equal to 0.33 inch and the rotation 300 equal to 0 (zero) degrees. Since the constant radius gear 46 is at a 0.25 elevation, y=h−0.25=8.0−0.25=7.75; and x=horizontal distance=8.75; and theta=α tan (7.75/8.75)=41.5 degrees; and sin(41.5)=0.663; and 0.663×0.5=0.332, which is about a first order approximation. FIG. 9F further shows the increments 304 of extension of the compression chain 70 (see FIG. 9C), corresponding to discrete points 305 along the tension member 24.

Figures 10E, 10F:
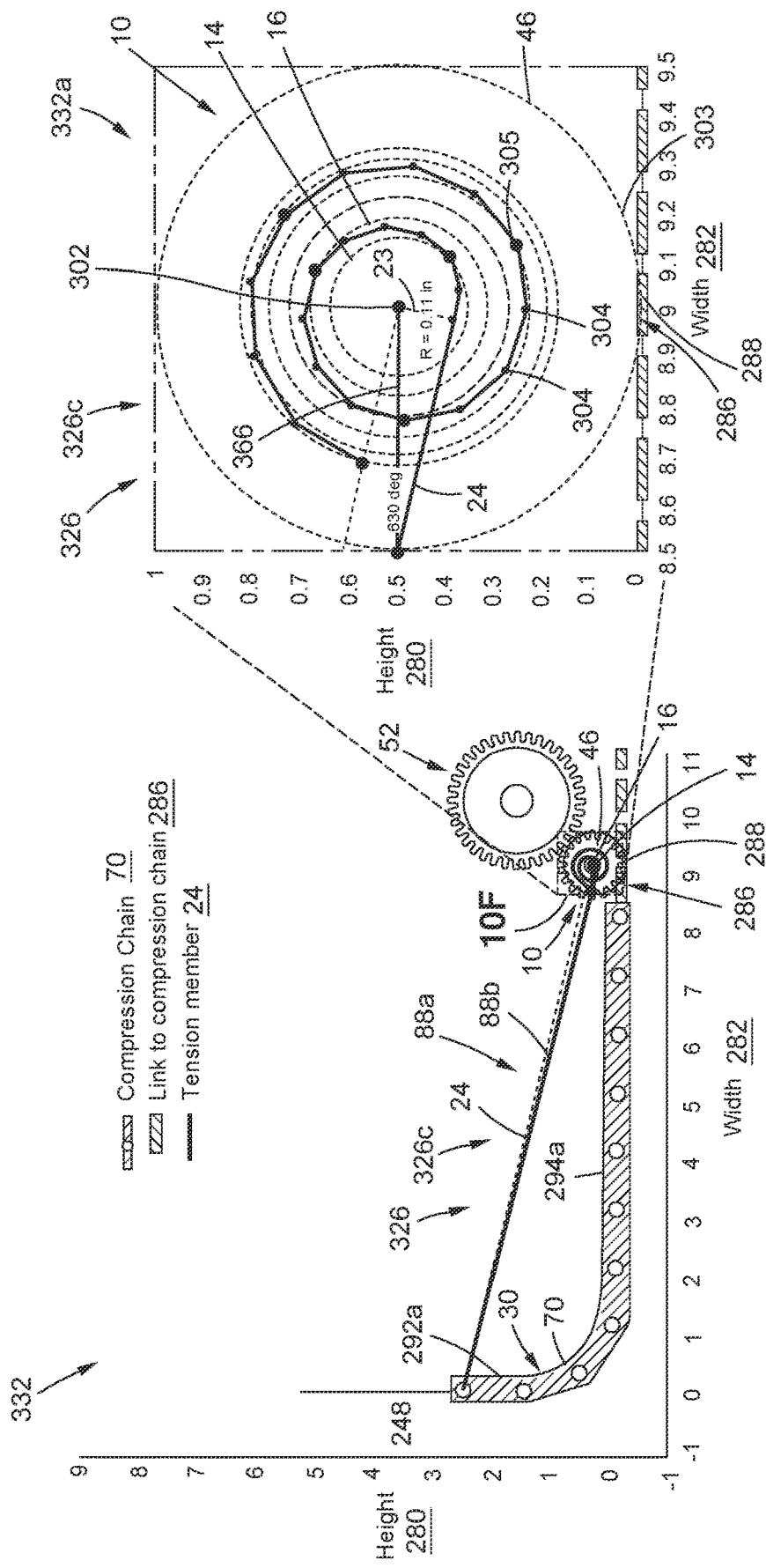
FIG. 10E is an illustration of a graph of height versus width of the geometric arrangement of FIG. 10A, showing a final position of the wing strut retracting sequence.
FIG. 10F is an illustration of an enlarged view of box 10E of FIG. 10F.

Now referring to FIGS. 10A-10F, FIGS. 10A-10F show a wing strut retracting sequence 326 of the geometric arrangement 284 showing various range of motion stages 88a of the tension member 24 and the compression chain 70. The geometric arrangement 284 for FIGS. 10A-10F follows the same rules or calculations as for FIGS. 9A-9F. The only difference is the direction of movement. In FIGS. 9A-9F, the variable length structural member 30, such as the compression chain 70, is extending, whereas in FIGS. 10A-10F, the variable length structural member 30, such as the compression chain 70, is retracting. FIGS. 10A, 10C, and 10E all show the geometric arrangement 284 of the variable radius assembly 10 with the tension member 24, the variable length structural member 30, such as the compression chain 70, and the rotational power source 52 for extending the compression chain 70 and the tension member 24. FIGS. 10A-10F all show the variable radius assembly 10 with the spindle 14, the variable radius guide member 16, the tension member 24, the constant radius gear 46, and the rotational power source 52. FIGS. 10A-10F all further show the link 286 comprising the rack 288 coupled to the compression chain 70. FIGS. 10B, 10D, and 10F all further show the center 302 of the constant radius gear 46, the spindle 14, and the variable radius guide member 16, the gear edge 303 in contact with the link 286, such as the rack 288, and the increments 304 (0.25 inch) of extension of the compression chain 70 corresponding to discrete points 305 along the tension member 24, where each increment 304 of extension represents an increment of extension of the tension member 24.

FIG. 10A is an illustration of a graph 328 of height 280 versus width 282 of the geometric arrangement 284, showing an initial position 326a of the wing strut retracting sequence 326. As shown in FIG. 10A, the geometric arrangement 284 comprises the variable radius assembly 10 with the tension member 24, the variable length structural member 30, such as the compression chain 70, the link 286, such as the rack 288, to the compression chain 70, and the rotational power source 52. FIG. 10B is an illustration of an enlarged view 328a of box 10B of FIG. 10A, showing the position of the tension member 24 around the variable radius guide member 16 for the height 280 of the end of the variable length structural member 30, such as the compression chain 70. FIGS. 10A-10B show the initial position 326a of the wing strut retracting sequence 326. FIG. 10A shows a fully extended range of motion stage 88d of the tension member 24 and the compression chain 70.

As shown in FIG. 10A, the height 280 of the vertical portion 292a of the compression chain 70 is 8.0 inches, and the width 282 of the horizontal portion 294a is approximately 3.0 inches. As shown in FIG. 10A, the compression chain 70 has portions 298 spaced approximately 1 (one) inch apart corresponding to the 1-inch intervals along the height 280 y-axis. FIG. 10B further shows the radius 23 equal to 0.33 inch and the rotation 300 equal to 0 (zero) degrees. FIG. 10B further shows the increments 304 of extension of the compression chain 70 (see FIG. 10A), corresponding to discrete points 305 along the tension member 24.

FIG. 10C is an illustration of a graph 330 of height 280 versus width 282 of the geometric arrangement 284 of FIG. 10A, showing an intermediate position 326b of the wing strut retracting sequence 326. As shown in FIG. 10C, the geometric arrangement 284 comprises the variable radius assembly 10 with the tension member 24, the variable length structural member 30, such as the compression chain 70, the link 286, such as the rack 288, to the compression chain 70, and the rotational power source 52. FIG. 10D is an illustration of an enlarged view 330a of box 10D of FIG. 10C, showing the position of the tension member 24 around the variable radius guide member 16 for the height 280 of the end of the variable length structural member 30, such as the compression chain 70. FIGS. 10C-10D show the intermediate position 326b of the wing strut retracting sequence 326. FIG. 10 shows an intermediate range of motion stage 88c of the tension member 24 and the compression chain 70.

As shown in FIG. 10C, the height 280 of the vertical portion 292a of the compression chain 70 is 5.0 inches, and the width 282 of the horizontal portion 294a is approximately 6.0 inches. As shown in FIG. 10C, the compression chain 70 has portions 298 spaced approximately 1 (one) inch apart corresponding to the 1-inch intervals along the height 280 y-axis. FIG. 10D further shows the radius 23 equal to 0.23 inch and the rotation 300 equal to 344 degrees. FIG. 10D further shows the increments 304 of extension of the compression chain 70 (see FIG. 10C), corresponding to discrete points 305 along the tension member 24.

FIG. 10E is an illustration of a graph 332 of height 280 versus width 282 of the geometric arrangement 284 of FIG. 10A, showing a final position 326c of the wing strut retracting sequence 326. As shown in FIG. 10E, the geometric arrangement 284 comprises the variable radius assembly 10 with the tension member 24, the variable length structural member 30, such as the compression chain 70, the link 286, such as the rack 288, to the compression chain 70, and the rotational power source 52. FIG. 10F is an illustration of an enlarged view 332a of box 10E of FIG. 10F, showing the position of the tension member 24 around the variable radius guide member 16 for the height 280 of the end of the variable length structural member 30, such as the compression chain 70. FIGS. 10E-10F show a final position 326c of the wing strut retracting sequence 326. FIG. 10E shows a fully retracted range of motion stage 88b of the tension member 24 and the compression chain 70.

As shown in FIG. 10E, the height 280 of the vertical portion 292a of the compression chain 70 is 2.5 inches, and the width 282 of the horizontal portion 294*a* is approximately 8.0 inches. As shown in FIG. 10E, the compression chain 70 has portions 298 spaced approximately 1 (one) inch apart corresponding to the 1-inch intervals along the height 280 y-axis. FIG. 10F further shows the radius 23 equal to 0.11 inch and the rotation 300 equal to 630 degrees. FIG. 10F further shows the increments 304 of extension of the compression chain 70 (see FIG. 10E), corresponding to discrete points 305 along the tension member 24. The geometric arrangement 284 shown in FIG. 10E is the same as the geometric arrangement 284 shown in FIG. 9A. The geometric arrangement 284 shown in FIG. 10C is the same as the geometric arrangement 284 in FIG. 9C. The geometric arrangement 284 shown in FIG. 10A is the same as the geometric arrangement 284 in FIG. 9E.

Figure 11:
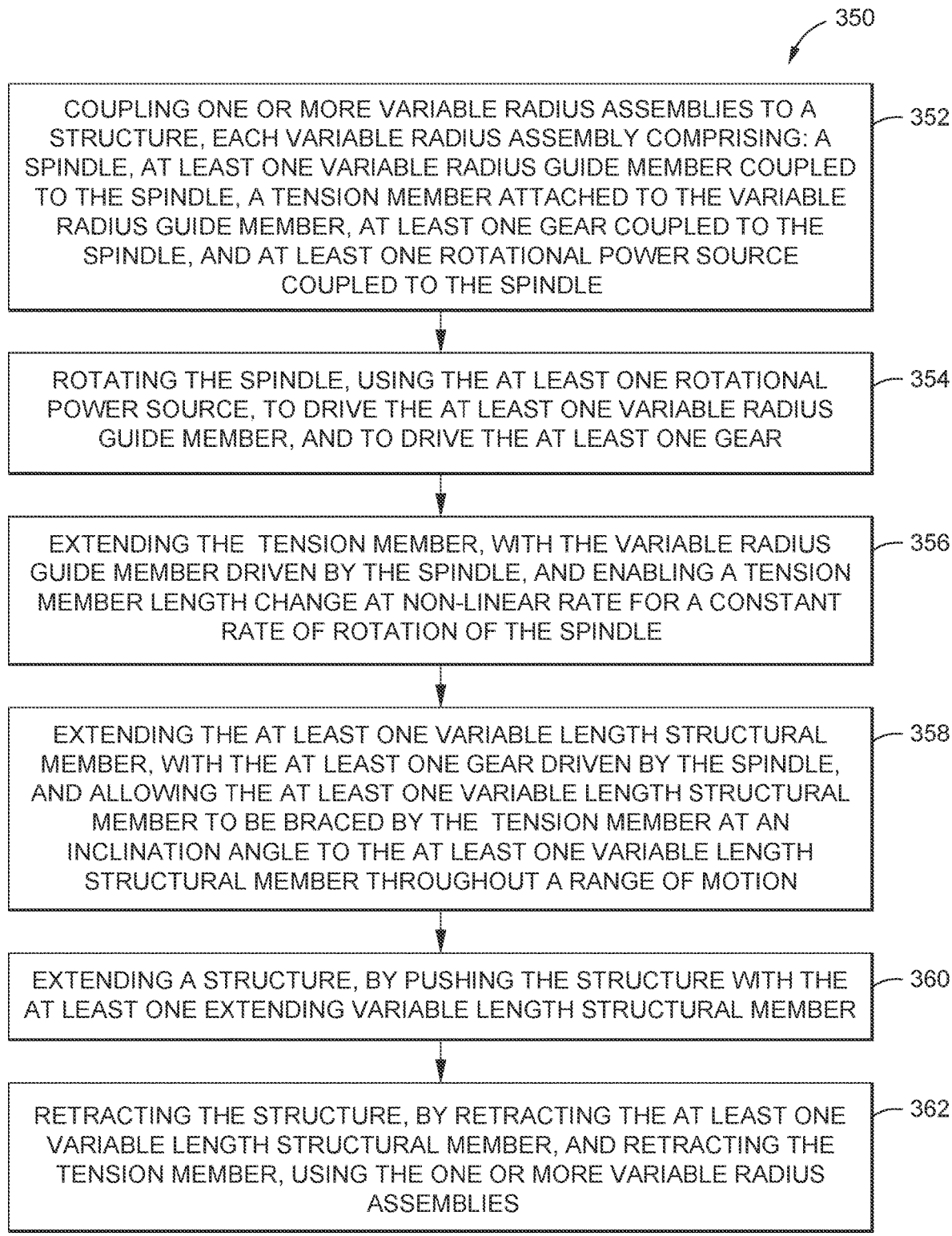
FIG. 11 is an illustration of a flow diagram of an exemplary version of a method of the disclosure.

Now referring to FIG. 11, FIG. 11 is an illustration of a flow diagram of an exemplary version of a method 350 of the disclosure. In another version of the disclosure, there is provided the method 350 of extending and retracting a structure 12 (see FIGS. 1, 3A3B) using one or more variable radius assemblies 10 (see FIGS. 1, 2A-2L). The variable radius assembly 10 accommodates a non-linear variation in a tension member length 26 (see FIG. 1) of a tension member 24 (see FIG. 1).

The blocks in FIG. 11 represent operations and/or portions thereof, or elements, and lines connecting the various blocks do not imply any particular order or dependency of the operations or portions thereof, or elements. FIG. 11 and the disclosure of the steps of the method 350 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 11, the method 350 comprises the step 352 of coupling the one or more variable radius assemblies 10 to the structure 12. Each variable radius assembly 10 comprises the spindle 14 (see FIGS. 1, 2A-2L), and at least one variable radius guide member 16 (see FIGS. 2A-2L) coupled to the spindle 14. The at least one variable radius guide member 16 has a spiral body 20 (see FIGS. 1, 2A) with a variable radius 22 (see FIGS. 1, 2H). Each variable radius assembly 10 further comprises the tension member 24 (see FIGS. 1, 2A-2E) attached to the at least one variable radius guide member 16 and also attached to at least one variable length structural member 30 (see FIGS. 1, 4A-4D). The tension member 24 is configured to wrap around or wind around the spiral body 20 and is configured to unwrap from, or unwind from, the spiral body 20. Each variable radius assembly 10 further comprises at least one gear 43 (see FIG. 1), for example, at least one constant radius gear 46 (see FIGS. 1, 2A-2F) coupled to the spindle 14, or at least one variable radius gear. In another version, the variable radius assembly 10 may further comprise a second gear 48 (see FIGS. 1, 2L), such as a drive gear 50 (see FIGS. 1, 2L). Each variable radius assembly 10 further comprises at least one rotational power source 52 (see FIGS. 1, 5A, 9A, 10A) coupled to the spindle 14.

The step 352 of coupling the one or more variable radius assemblies 10 to the structure 12 further comprises, coupling the one or more variable radius assemblies 10, where the spiral body 20 of each variable radius assembly 10 further comprises, the first continuous spiral surface 198 (see FIGS. 2B, 2I) substantially parallel to the spindle 14 and having a constant width 200 (see FIG. 2I). As shown in FIG. 2I, the first continuous spiral surface 198 further has a groove 202 configured to receive the tension member 24. As shown in FIG. 2I, the spiral body 20 of each variable radius assembly 10 further comprises, the second continuous spiral surface 204 substantially perpendicular to the spindle 14 and having a width 206.

As discussed above, the spiral body 20 preferably has a truncated conical spiral shape 195 (see FIG. 2A), and in one version, a central through opening 196 (see FIGS. 2A, 2I) through which the spindle 14 is inserted. In one version, the spindle 14 and the variable radius guide member 16 are separate parts 15 (see FIG. 2I) coupled together. In another version, the spindle 14 and the variable radius guide member 16 are integral and integrated in an integral part 17 (see FIG. 2J). As shown in FIG. 2C, the spindle 14 has a first spindle end 184*a* and a second spindle end 184*b*, where the first spindle end 184*a* and the second spindle end 184*b* extending beyond the central through opening 196 of the spiral body 20, and extend beyond the variable radius guide member 16 and the gear 43, such as the constant radius gear 46. As shown in FIG. 1, the tension member 24 may comprise one of, a cable 32, a cord 34, a wire 36, or an assembly 38 (see also FIG. 2K) comprising a rod 40 coupled, via a connector element 42, to one of, the cable 32, the cord 34, or the wire 36.

As shown in FIG. 11, the method 350 further comprises the step 354 of rotating the spindle 14, using the at least one rotational power source 52, to drive the at least one variable radius guide member 16, and to drive the at least one gear 43, for example, at least one constant radius gear 46.

The step 354 of rotating the spindle 14, using the at least one rotational power source 52 may further comprise, rotating the spindle 14, using the at least one rotational power source 52 comprising a torque tube 54 (see FIGS. 1, 4A-4D) with at least one intermediary gear 56 (see FIGS. 1, 4A, 4C, 5A, 9A, 10A) attached to the torque tube 54. The at least one intermediary gear 56 is configured to engage with the at least one gear 43. The at least one intermediary gear 56 has intermediary gear teeth 58 (see FIGS. 4A, 4C) configured to mesh with gear teeth of the gear 43. When the at least one gear 43 comprises the constant radius gear 46, the intermediary gear teeth 58 of the intermediary gear 56 mesh with constant radius gear teeth 60 (see FIGS. 4A, 4C) of the constant radius gear 46 (see FIGS. 4A, 4C).

As shown in FIG. 11, the method 350 further comprises the step 356 of extending the tension member 24, with the variable radius guide member 16 driven by the spindle 14, and enabling a tension member length change 26*a* (see FIG. 1) at a non-linear rate 28 (see FIG. 1) for a constant rate of rotation 84 (see FIG. 1) of the spindle 14.

As shown in FIG. 11, the method 350 further comprises the step 358 of extending the at least one variable length structural member 30, with the at least one gear 43, for example, at least one constant radius gear 46, driven by the spindle 14, and allowing the at least one variable length structural member 30 to be braced by the tension member 24 at an inclination angle 86 (see FIG. 1) to the at least one variable length structural member 30 throughout a range of motion 88 (see FIG. 1).

The step 358 of extending the at least one variable length structural member 30 further comprises, extending the at least one variable length structural member 30 comprising at least one of, a compression chain 70 (see FIGS. 1, 4A-4D, 5A, 9A, 10A), a cam element 72 (see FIG. 1), a spring 74 (see FIG. 1), or a telescoping structural compression member 78 (see FIG. 1). The step 360 of extending the structure 12, by pushing the structure 12 with the at least one extending variable length structural member 30 further comprises, extending the structure 12 comprising one of, a wing strut 90 (see FIGS. 1, 4A-4D) of an aircraft 94a (see FIGS. 1, 3A-3B). As shown in FIG. 1, the structure 12 may further comprise an object 154 movable from an underground position 156 to one or more above ground positions 158, including a support structure 160 with one or more of, a sensor device 162, a surveillance apparatus 164, and a weapon 166. As shown in FIG. 1, the structure 12 may further comprise a variable elevation platform 170, including a stage platform 172; an extendable ladder 174; an extendable mast 176; an extendable pole 178; a periscope 180 of a submarine vehicle 182, or another suitable structure.

As shown in FIG. 11, the method 350 further comprises the step 362 of retracting the structure 12, by retracting the at least one variable length structural member 30 and retracting the tension member 24, using the one or more variable radius assemblies 10.

Figure 12:
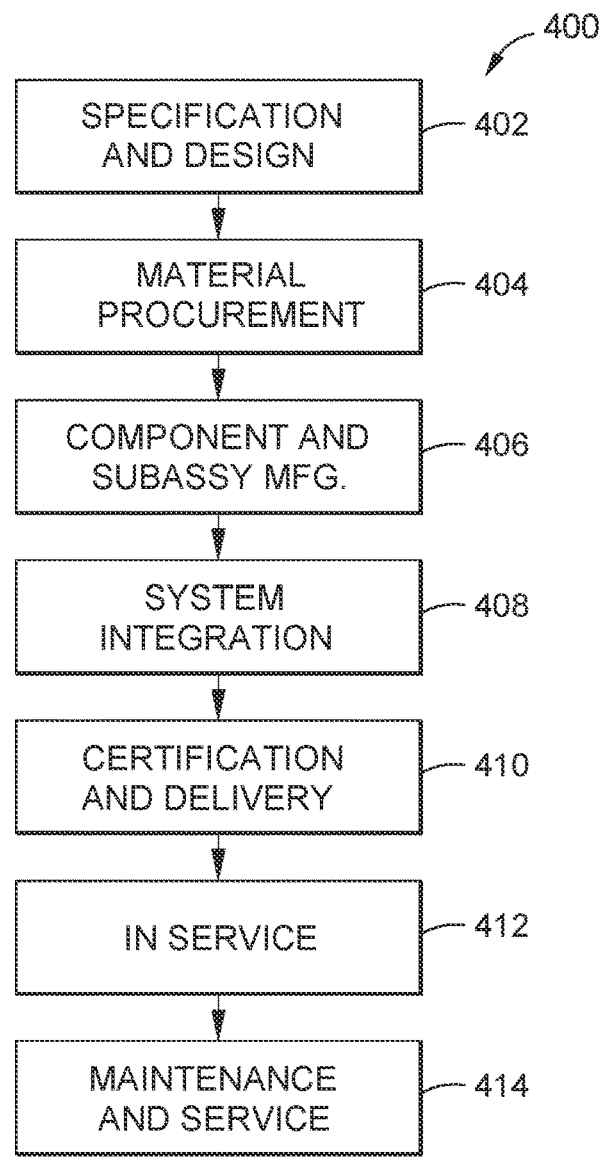
FIG. 12 is an illustration of a flow diagram of an exemplary aircraft manufacturing and service method.
Figure 13:
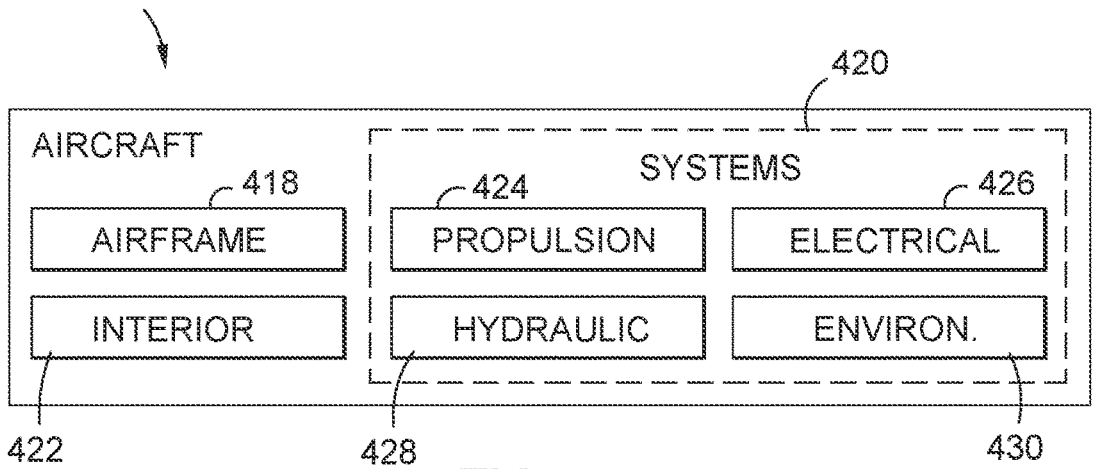
FIG. 13 is an illustration of an exemplary block diagram of an aircraft.

Now referring to FIGS. 12 and 13, FIG. 12 is an illustration of a flow diagram of an exemplary aircraft manufacturing and service method 400, and FIG. 13 is an illustration of an exemplary block diagram of an aircraft 416. Referring to FIGS. 12 and 13, versions of the disclosure may be described in the context of the aircraft manufacturing and service method 400 as shown in FIG. 12, and the aircraft 416 as shown in FIG. 13.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 13, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the variable radius assembly 10 (see FIGS. 1, 2A-2L, 9A-9F, 10A-10F), the aircraft 94a (see FIGS. 1, 3A-3B) with one or more variable radius assemblies 10, and the method 350 (see FIG. 11) provide an improved variable radius assembly 10 that is used with variable length structural members 30 (see FIG. 1), such as a compression chains 70 (see FIG. 1), to extend and retract a structure 12 (see FIG. 1), such as a wing strut 90 (see FIGS. 1, 3A-3B) of an aircraft 94a (see FIG. 1, 3A-3B) or another structure, to enable a desired non-linear variation of tension member lengths 26 (see FIG. 1), such as cable lengths. The variable radius assembly 10 comprises the spindle 14 (see FIGS. 1, 2A), the variable radius guide member 16 (see FIGS. 1, 2A), the tension member 24 (see FIGS. 1, 2A), such as the cable 32 (see FIGS. 1, 2A), one or more gears 43 (see FIG. 1), such as the constant radius gear 46 (see FIG. 1), and the rotational power source 52, such as the torque tube 54 (see FIGS. 1, 4A), and the variable radius guide member 16 enables a tension member length change 26a (see FIG. 1) at a non-linear rate 28 (see FIG. 1) for a constant rate of rotation 84 (see FIG. 1) of the spindle 14, allowing the variable length structural member 30, such as the compression chain 70, to be braced by the tension member 24, such as the cable 32, at an inclination angle 86 (see FIG. 1) to the variable length structural member 30 throughout a range of motion 88 (see FIG. 1).

In addition, disclosed versions of the variable radius assembly 10 (see FIGS. 1, 2A-2L, 9A-9F, 10A-10F), the aircraft 94a (see FIGS. 1, 3A-3B) with one or more variable radius assemblies 10, and the method 350 (see FIG. 11) provide a mechanism to extend and retract a structure 12, such as a wing strut 90 (see FIGS. 1, 3A-3B, 4A, 4C) of an aircraft 94a (see FIGS. 3A-3B). For the structure 12 comprising the wing strut 90, the compression chain 70 extends the thickness 91 (see FIG. 1) of the wing strut 90 (see FIGS. 1, 3A) from a contracted position 110 (see FIG. 4C) to an extended position 112 (see FIG. 4A), and to extend the thickness 103 (see FIG. 1) of the strut cross section 102 (see FIGS. 1, 4A) from a contracted airfoil shape 106 (see FIG. 4C) to an extended airfoil shape 108 (see FIG. 4A). The variable radius assembly 10 and compression chains 70 enable a more efficient thin or small strut cross section 102 for a cruise flight condition 120 (see FIGS. 1, 4C) of a flight of the aircraft 94a (see FIGS. 3A-3B), allows for a wing strut 90 that is lightweight to carry compression load for a wing down-bending flight condition 125 (see FIG. 1) and a minus 1 g pushover flight condition 124 (see FIG. 1), while preserving a weight-savings aspect for the wing 92 (see FIGS. 1, 3A), that avoids the "scissor jack phenomenon", eliminates cable drooping without adding unwanted weight, avoids excessive tension 128 (see FIG. 1) to the wing 92 to prevent bending stresses, and has a lower aerodynamic drag. Moreover, the variable radius assembly 10 and compression chains 70 can be used with other structures 12 to extend the structures from a retracted position to an extended position, and to retract the structures 12 from an extended position to a retracted position. Other structures 12 include an object 154 (see FIG. 1), for example, a support structure 160 (see FIG. 1) with a sensor device 162 (see FIG. 1), a surveillance apparatus 164 (see FIG. 1), a weapon 166 (see FIG. 1), or another suitable device, or such as a variable elevation platform 170 (see FIG. 1), an extendable ladder 174 (see FIG. 1), an extendable mast 176 (see FIG. 1), a periscope 180 (see FIG. 1) of a submarine vehicle 182 (see FIG. 1), or another suitable structure.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A variable radius assembly comprising:
    a spindle;
    at least one variable radius guide member coupled to, and driven by, the spindle, the at least one variable radius guide member having a spiral body with a variable radius;
    a tension member attached to the at least one variable radius guide member, the tension member configured to wrap around the spiral body and configured to attach to at least one variable length structural member;
    at least one gear coupled to, and driven by, the spindle, and configured to drive the at least one variable length structural member; and
    at least one rotational power source coupled to the spindle, and configured to rotate the spindle,
    wherein the at least one variable radius guide member enables a tension member length change at a non-linear rate for a constant rate of rotation of the spindle, allowing the at least one variable length structural member to be braced by the tension member at an inclination angle to the at least one variable length structural member throughout a range of motion.

2. The variable radius assembly of claim 1, wherein the spiral body has a truncated conical spiral shape and a central through opening through which the spindle is inserted.

3. The variable radius assembly of claim 1, wherein the spindle and one of the at least one variable radius guide members comprise one of, separate parts coupled together, or an integral part.

4. The variable radius assembly of claim 1, wherein the spiral body has a first continuous spiral surface substantially parallel to the spindle and having a constant width.

5. The variable radius assembly of claim 1, wherein the spiral body has a second continuous spiral surface substantially perpendicular to the spindle and having a width.

6. The variable radius assembly of claim 1, wherein the tension member comprises one of:
    a cable;
    a cord;
    a wire; or
    an assembly comprising a rod coupled, via a connector element, to one of, the cable, the cord, or the wire.

7. The variable radius assembly of claim 1, wherein the at least one variable length structural member comprises at least one of:
    a compression chain;
    a cam element;
    a spring; or
    a telescoping structural compression member.

8. The variable radius assembly of claim 1, wherein the at least one gear comprises at least one constant radius gear.

9. The variable radius assembly of claim 1, wherein the at least one rotational power source comprises a torque tube with at least one intermediary gear attached to the torque tube, the at least one intermediary gear configured to engage with the at least one gear.

10. An aircraft having a wing strut with one or more variable radius assemblies, the aircraft comprising:
    a fuselage;
    two wings coupled to the fuselage, and extending from the fuselage opposite each other;
    the wing strut attached to each of the two wings, the wing strut having a strut cross section with an airfoil shape;
    the one or more variable radius assemblies coupled to an interior of each wing strut, each variable radius assembly comprising:
        a spindle;
        at least one variable radius guide member coupled to, and driven by, the spindle, the at least one variable radius guide member having a spiral body with a variable radius;
        a tension member attached to the at least one variable radius guide member, the tension member configured to wrap around the spiral body;
        at least one constant radius gear coupled to, and driven by, the spindle; and
        at least one rotational power source coupled to the spindle, and configured to rotate the spindle,
    one or more variable length structural members attached to the tension member of each of the one or more variable radius assemblies, and driven by the at least one constant radius gear, the one or more variable length structural members configured to transition the wing strut between a contracted position and an extended position, and configured to transition the strut cross section between a contracted airfoil shape and an extended airfoil shape,
    wherein the at least one variable radius guide member of each of the one or more variable radius assemblies enables a tension member length change at a non-linear rate for a constant rate of rotation of the spindle, allowing the one or more variable length structural members to be braced by the tension member at an inclination angle to the one or more variable length structural members throughout a range of motion.

11. The aircraft of claim 10, wherein the spiral body has a truncated conical spiral shape and a central through opening through which the spindle is inserted.

12. The aircraft of claim 10, wherein the spiral body further comprises:
    a first continuous spiral surface substantially parallel to the spindle and having a constant width, the first continuous spiral surface further having a groove configured to receive the tension member; and
    a second continuous spiral surface substantially perpendicular to the spindle and having a width.

13. The aircraft of claim 10, wherein the tension member comprises:
    a cable;
    a cord;
    a wire; or an assembly comprising a rod coupled, via a connector element, to one of, the cable, the cord, or the wire.

14. The aircraft of claim 10, wherein the one or more variable length structural members comprise one of:
   one or more compression chains;
   one or more cam elements;
   one or more springs; or
   one or more telescoping structural compression members.

15. The aircraft of claim 10, wherein the at least one rotational power source comprises a torque tube with at least one intermediary gear attached to the torque tube, the at least one intermediary gear having intermediary gear teeth configured to mesh with constant radius gear teeth of the at least one constant radius gear.

16. A method of extending and retracting a structure using one or more variable radius assemblies, the method comprising the steps of:
   coupling the one or more variable radius assemblies to the structure, each variable radius assembly comprising:
      a spindle;
      at least one variable radius guide member coupled to the spindle, the at least one variable radius guide member having a spiral body with a variable radius;
      a tension member attached to the at least one variable radius guide member and attached to at least one variable length structural member, the tension member configured to wrap around the spiral body;
      at least gear coupled to the spindle; and
      at least one rotational power source coupled to the spindle;
   rotating the spindle, using the at least one rotational power source, to drive the at least one variable radius guide member, and to drive the at least one gear;
   extending the tension member, with the variable radius guide member driven by the spindle, and enabling a tension member length change at a non-linear rate for a constant rate of rotation of the spindle;
   extending the at least one variable length structural member, with the at least one gear driven by the spindle, and allowing the at least one variable length structural member to be braced by the tension member at an inclination angle to the at least one variable length structural member throughout a range of motion;
   extending the structure, by pushing the structure with the at least one extending variable length structural member; and
   retracting the structure, by retracting the at least one variable length structural member, and retracting the tension member, using the one or more variable radius assemblies.

17. The method of claim 16, wherein the step of coupling the one or more variable radius assemblies to the structure further comprises, coupling the one or more variable radius assemblies, where the spiral body of each variable radius assembly further comprises:
   a first continuous spiral surface substantially parallel to the spindle and having a constant width, the first continuous spiral surface further having a groove configured to receive the tension member; and
   a second continuous spiral surface substantially perpendicular to the spindle and having a width.

18. The method of claim 16, wherein the step of rotating the spindle, using the at least one rotational power source further comprises, rotating the spindle, using the at least one rotational power source comprising:
   a torque tube with at least one intermediary gear attached to the torque tube, the at least one intermediary gear configured to engage with the at least one gear.

19. The method of claim 16, wherein the step of extending the at least one variable length structural member further comprises, extending the at least one variable length structural member comprising at least one of:
   a compression chain;
   a cam element;
   a spring; or
   a telescoping structural compression member.

20. The method of claim 16, wherein the step of extending the structure further comprises, extending the structure comprising one of:
   a wing strut of an aircraft;
   an object movable from an underground position to one or more above ground positions, including a support structure with one or more of, a sensor device, a surveillance apparatus, and a weapon;
   a variable elevation platform, including a stage platform;
   an extendable ladder;
   an extendable mast;
   an extendable pole; or
   a periscope of a submarine vehicle.

* * * * *

UNITED STATES PATENT AND TRADEMARK OFFICE
CERTIFICATE OF CORRECTION

PATENT NO. : 12,122,509 B2
APPLICATION NO. : 18/171346
DATED : October 22, 2024
INVENTOR(S) : Robert E. Grip, John J. Brown and Nathaniel J. Noel It is certified that error appears in the above-identified patent and that said Letters Patent is hereby corrected as shown below:

In the Claims

Column 37, Claim 16, Line 28: Please add "one" after "at least" and before "gear coupled to the spindle".

Signed and Sealed this
Nineteenth Day of November, 2024

Katherine Kelly Vidal
*Director of the United States Patent and Trademark Office*